United States Patent
Abhishek

(10) Patent No.: US 12,229,644 B2
(45) Date of Patent: Feb. 18, 2025

(54) TEXT AUGMENTATION OF A MINORITY CLASS IN A TEXT CLASSIFICATION PROBLEM

(71) Applicant: KYNDRYL, INC., New York, NY (US)

(72) Inventor: Kumar Abhishek, Khariar (IN)

(73) Assignee: Kyndryl, Inc., New York, NY (US)

( * ) Notice: Subject to any disclaimer, the term of this patent is extended or adjusted under 35 U.S.C. 154(b) by 966 days.

(21) Appl. No.: 17/302,268

(22) Filed: Apr. 29, 2021

(65) Prior Publication Data

US 2022/0366293 A1  Nov. 17, 2022

(51) Int. Cl.
G06N 20/00 (2019.01)
G06F 16/23 (2019.01)
G06F 40/284 (2020.01)

(52) U.S. Cl.
CPC ......... G06N 20/00 (2019.01); G06F 16/2379 (2019.01); G06F 40/284 (2020.01)

(58) Field of Classification Search
CPC .... G06N 20/00; G06F 16/2379; G06F 40/284
See application file for complete search history.

(56) References Cited

U.S. PATENT DOCUMENTS

| | | | |
|---|---|---|---|
| 6,279,017 B1 | 8/2001 | Walker | |
| 7,036,075 B2 | 4/2006 | Walker | |
| 7,765,471 B2 | 7/2010 | Walker | |
| 7,861,163 B2 | 12/2010 | Walker | |
| 8,429,098 B1 * | 4/2013 | Pawar | G06F 16/353 706/12 |
| 8,504,562 B1 * | 8/2013 | Ikeda | G06F 16/3338 707/723 |
| 2002/0091713 A1 | 7/2002 | Walker | |
| 2006/0129922 A1 | 6/2006 | Walker | |

(Continued)

FOREIGN PATENT DOCUMENTS

| | | |
|---|---|---|
| CN | 108897769 A | 11/2018 |
| CZ | 302985 B6 | 2/2012 |

OTHER PUBLICATIONS

Munkhdalai et al., "Self-training in significance space of support vectors for imbalanced biomedical event data", BMC Bioinformatics, Apr. 23, 2015, pp. 1-8 (Year: 2015).*

(Continued)

*Primary Examiner* — Tamara T Kyle
*Assistant Examiner* — William Wong
(74) *Attorney, Agent, or Firm* — CANTOR COLBURN LLP; Erik Swanson

(57) ABSTRACT

An approach is provided for augmenting text of a small class for text classification. An imbalanced dataset is received. A small class is identified. The small class includes initial text records in the imbalanced dataset. A balanced dataset is generated from the imbalanced dataset by augmenting the initial text records by using weighted word scores indicating respective measures of importance of words in classes in the imbalanced dataset. The balanced dataset is sent to a supervised machine learning model. The supervised machine learning model is trained on the balanced dataset. Using the supervised machine learning model which employs the augmented initial text records, a text classification of a new dataset is performed. The domain of the new dataset matches the domain of the imbalanced dataset.

17 Claims, 15 Drawing Sheets

(56) References Cited

U.S. PATENT DOCUMENTS

| | | | |
|---|---|---|---|
| 2008/0222518 A1 | 9/2008 | Walker | |
| 2010/0306144 A1* | 12/2010 | Scholz | G06N 20/00 |
| | | | 707/E17.014 |
| 2013/0041885 A1 | 2/2013 | Bennett | |
| 2013/0145241 A1 | 6/2013 | Salama | |
| 2013/0311181 A1* | 11/2013 | Bachtiger | G06F 16/345 |
| | | | 704/235 |
| 2017/0075935 A1* | 3/2017 | Lagos | G06N 5/022 |
| 2017/0270546 A1* | 9/2017 | Kulkarni | G06Q 30/0201 |
| 2018/0373691 A1* | 12/2018 | Alba | G06F 40/166 |
| 2019/0050624 A1* | 2/2019 | Chai | G06N 20/00 |
| 2019/0121842 A1 | 4/2019 | Catalano | |

OTHER PUBLICATIONS

Hakim et al., "Oversampling Imbalance Data: Case Study on Functional and Non Functional Requirement," 2018 Electrical Power, Electronics, Communications, Controls and Informatics Seminar (EECCIS), 2018, pp. 315-319 (Year: 2018).*

Abdollahi et al., "A Dictionary-based Oversampling Approach to Clinical Document Classification on Small and Imbalanced Dataset," 2020 IEEE/WIC/ACM International Joint Conference on Web Intelligence and Intelligent Agent Technology (WI-IAT), 2020, pp. 357-364 (Year: 2020).*

Nikhila et al., "Text Imbalance Handling and Classification for Cross-platform Cyber-crime Detection using Deep Learning," 2020 11th International Conference on Computing, Communication and Networking Technologies (ICCCNT), 2020, pp. 1-7 (Year: 2020).*

Kobayashi, Sosuke; Contextual Augmentation: Data Augmentation by Words with Paradigmatic Relations; Proceedings of the 2018 Conference of the North American Chapter of the Association for Computational Linguistics: Human Language Technologies, vol. 2 (Short Papers); Jun. 2018; pp. 452-457.

Kothiya, Yogesh; How I handled imbalanced text data; https://towardsdatascience.com/how-i-handled-imbalanced-text-data-ba9b757ab1d8; May 15, 2019; 6 pages.

Koto, Fajri; SMOTE-Out, SMOTE-Cosine, and Selected-SMOTE: An Enhancement Strategy to Handle Imbalance in Data Level; Conference: The 6th International Conference on Advanced Computer Science and Information Systems (ICACSIS); Oct. 2014; pp. 193-197.

Liu, Ruibo et al.; Data Boost: Text Data Augmentation Through Reinforcement Learning Guided Conditional Generation; arXiv:2012.02952v1; Dec. 5, 2020; 11 pages.

Mnasri, Maali; Text augmentation for Machine Learning tasks: How to grow your text dataset for classification? https://medium.com/opla/text-augmentation-for-machine-learning-tasks-how-to-grow-your-text-dataset-for-classification-38a9a207f88d; Jan. 18, 2019; 9 pages.

Paduraiu, Cristian et al.; Dealing with Data Imbalance in Text Classification; Procedia Computer Science 159; 2019; pp. 736-745.

Wei, Jason et al; EDA: Easy Data Augmentation Techniques for Boosting Performance on Text Classification Tasks; Proceedings of the 2019 Conference on Empirical Methods in Natural Language Processing and the 9th International Joint Conference on Natural Language Processing; Nov. 2019; pp. 6382-6388.

* cited by examiner

TEXT AUGMENTATION OF A MINORITY CLASS IN A TEXT CLASSIFICATION PROBLEM

BACKGROUND

The present invention relates to information classification, and more particularly to augmenting text to balance a dataset to improve performance of a supervised machine learning model.

Text classification techniques automatically assign categories from a set of predefined categories to unstructured text (e.g., assignment of tags to customer queries). Text classification is a fundamental task included in natural language processing. Supervised text classification is text classification using a supervised machine learning model whereby the assignment of categories to text is based on past observations (i.e., labeled training data consisting of a set of training examples).

Performance of a supervised machine learning model can be improved by using a larger set of training examples. Data augmentation can provide a larger set of training examples by generating additional, synthetic training data using the already existing training data. Existing data augmentation approaches avoid the costly and time-consuming approach of acquiring and labeling additional actual observations. One known data augmentation technique is Easy Data Augmentation (EDA), which consists of four operations: synonym replacement, random insertion, random swap, and random deletion.

SUMMARY

In one embodiment, the present invention provides a computer-implemented method. The method includes receiving, by one or more processors, an imbalanced dataset. The method further includes identifying, by the one or more processors, a small class that includes initial text records included in the imbalanced dataset. The method further includes generating, by the one or more processors, a balanced dataset from the imbalanced dataset by augmenting the initial text records by using weighted word scores indicating respective measures of importance of words in classes in the imbalanced dataset. The method further includes sending, by the one or more processors, the balanced dataset to a supervised machine learning model. The method further includes training, by the one more processors, the supervised machine learning model on the balanced dataset. The method further includes using the supervised machine learning model employing the augmented initial text records, performing, by the one or more processors, a text classification of a new dataset whose domain matches a domain of the imbalanced dataset.

A computer program product and a computer system corresponding to the above-summarized method are also described and claimed herein.

DETAILED DESCRIPTION

Overview

Figure 1:
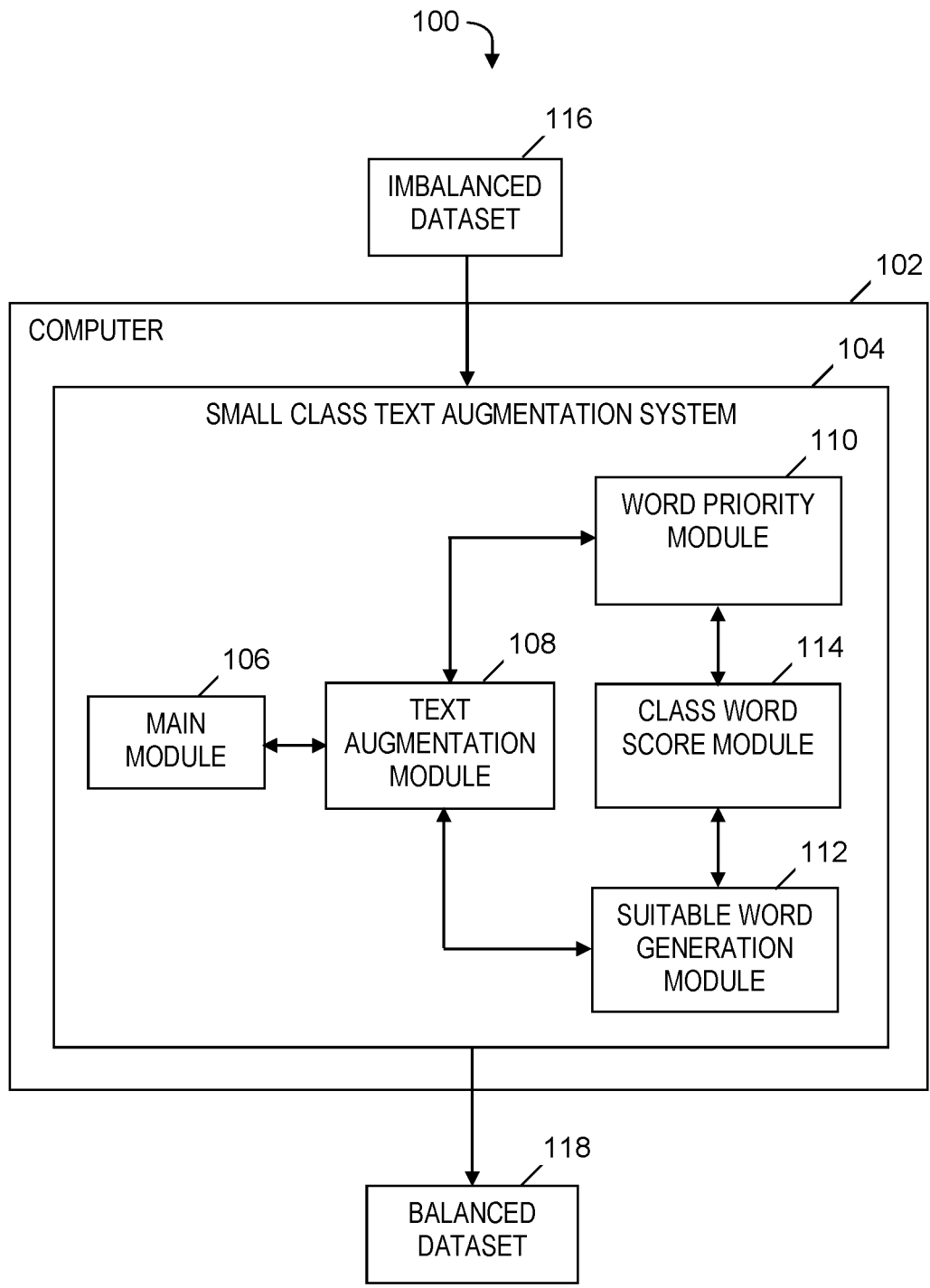
FIG. 1 is a block diagram of a system for augmenting text of a small class, in accordance with embodiments of the present invention.

A supervised text classification dataset often includes highly imbalanced data which has a few classes that contain a very large number of text records (i.e., large classes, which are also known as major classes) and a few classes that contain a very small number of text records (i.e., small classes, which are also known as minor classes). New records in a dataset to be classified can confuse a supervised machine learning algorithm if the new records are to be placed in small classes because the algorithm is biased towards placing records in large classes. Thus, the highly imbalanced data decreases performance of a text classification machine learning model (i.e., supervised text classification model), in terms of decreased accuracy, decreased F1 score, and similar effects on other parameters. Current approaches to balancing a dataset include (1) text record level methods of oversampling of small class text records and under-sampling large class text records; (2) word level methods of (i) randomly replacing any word by its synonym or antonym, per a language dictionary, (ii) randomly replacing any word by an equivalent word generated by a static word embeddings model based on cosine similarity, (iii) randomly replacing any word by an equivalent word generated by a contextual language model based on surrounding words in a text record, (iv) randomly inserting any word at any position in the text record, and (v) randomly deleting any word at any position in a text record; and (3) character level methods of randomly inserting any character at any position in any word in a text record and randomly deleting any character at any position in any word in a text record. Using the current approaches for balancing the dataset, the text classification machine learning model remains deficient in terms of accuracy and F1 score. The aforementioned static word embeddings model and the contextual language model do not consider class-specific word structure. Furthermore, contextual language models generate different embeddings for the same word in different contexts whereas static word embeddings models do not consider the context of the word. In the aforementioned word level methods, synonyms may not consider word context and class-specific word structure and some words may not have synonyms.

As used herein, an F1 score is defined as the harmonic mean of a supervised machine learning model's precision and recall and is a measure of the model's accuracy on a dataset.

Embodiments of the present invention address the aforementioned unique challenges of traditional text classification techniques by providing an approach of text augmentation of a small class to balance a dataset to improve the performance of a text classification machine learning model in terms of accuracy, F1 score, and generalizability. In one embodiment, text augmentation of a small class balances the dataset from a class point of view rather than at a record level. In one embodiment, text augmentation of a small class in text classification problems uses a combination of word importance statistics, natural language processing (i.e., lexical natural language features and syntactic natural language features), and natural language generation (i.e., word context). In one embodiment, the text augmentation approach includes selecting words to be replaced in the text record by using lexical features, syntactic features, and word importance statistics. In one embodiment, the text augmentation approach includes generating replacement word(s) by using lexical features, contextual relevance, and word importance statistics.

System for Augmenting Text of a Small Class

FIG. 1 is a block diagram of a system 100 for augmenting text of a small class, in accordance with embodiments of the present invention. System 100 includes a computer 102 that includes a software-based small class text augmentation system 104, which includes a main module 106, a text augmentation module 108, a word priority module 110, a suitable word generation module 112, and a class word score module 114.

Small class text augmentation system 104 receives an imbalanced dataset 116, which is a supervised text classification dataset. As used herein, an imbalanced dataset is a dataset that includes (1) a relatively small number of classes (i.e., large class) that include a substantially large number of text records and (2) a relatively small number of classes (i.e., small class) that include a substantially small number of text records. As an example, imbalanced dataset 116 may include a single large class that includes 65% of the total number of text records in imbalanced dataset 116 and a single small class that includes 1% of the total number of text records. As used herein, "relatively small number of classes" means a number of classes that is substantially less than the total number of classes that categorize text records in the dataset.

Main module 106 receives the imbalanced dataset 116 and reads the text records and their classes in the imbalanced dataset 116. Main module 106 identifies a small class among the classes in the imbalanced dataset 116 and sends the small class to text augmentation module 108, which augments the text records in the small class and sends back to main module 106 (i) the old text records (i.e., initial text records) that were initially in the small class in the imbalanced dataset 116 and (ii) new augmented text records. Main module 106 creates a balanced dataset 118 that includes the old text records and the new augmented text records. Although not shown in FIG. 1, small class text augmentation system 104 sends the balanced dataset 118 to a text classification model (i.e., supervised machine learning model) and trains the text classification model on the balanced dataset 118. Furthermore, small class text augmentation system 104 uses the trained text classification model to perform a text classification on a new dataset whose domain matches the domain of the imbalanced dataset 116. The performance of the text classification in terms of accuracy and F1 score is enhanced because the text classification model was trained on balanced dataset 118 instead of imbalanced dataset 116.

Text augmentation module 108 sends text records of the small class to word priority module 110, which selects the words in the text records that can be replaced and determines in what order the selected words can be replaced. Word priority module 110 selects the words to be replaced by considering lexical features, syntactic features, and word importance statistics (i.e., word frequency statistics). Word priority module 110 creates a word priority list that includes the selected words in a descending order based on respective word scores calculated by class word score module 114. The word scores indicate a measure of importance of the corresponding words from a class point of view.

Text augmentation module 108 sends each word in the aforementioned word priority list and the corresponding text record to suitable word generation module 112, which generates a suitable word list for a given word. The suitable word list includes word(s) that text augmentation module 108 uses to replace the given word, thereby creating a new augmented text record. Suitable word generation module 112 selects the word(s) in the suitable word list based on suitable word scores that are based on cosine similarity scores with class-based word importance statistics, contextual probability scores with class-based word importance statistics, and synonym-based class word scores. Class word score module 114 calculates class word scores that are used in conjunction with the aforementioned cosine similarity scores, contextual probability scores, and synonym-based class word scores to generate suitable word scores.

Figure 2:
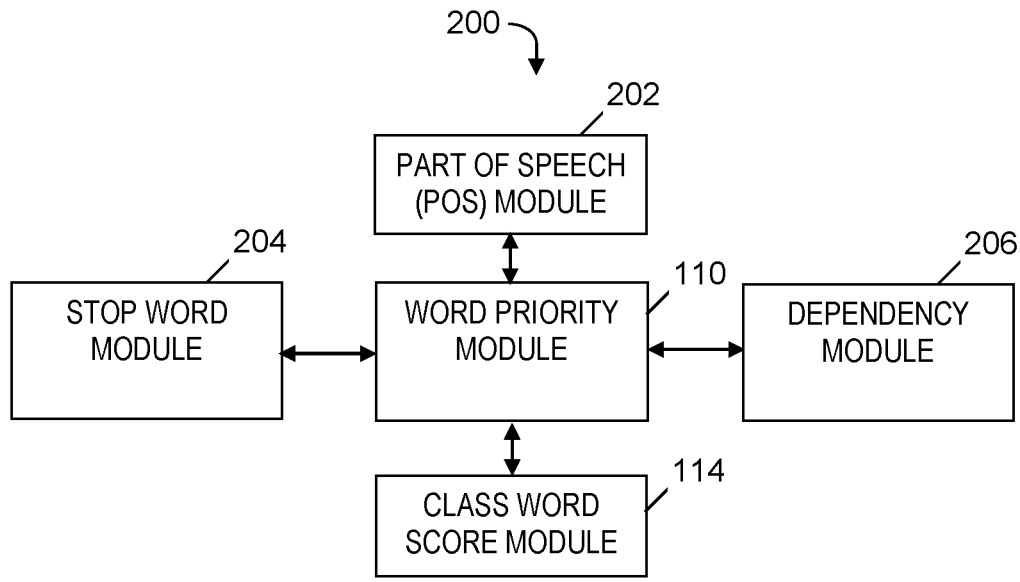
FIG. 2 is a block diagram of a system for determining words in a text record that can be replaced, where the system is implemented within the system of FIG. 1, in accordance with embodiments of the present invention.
Figure 3:
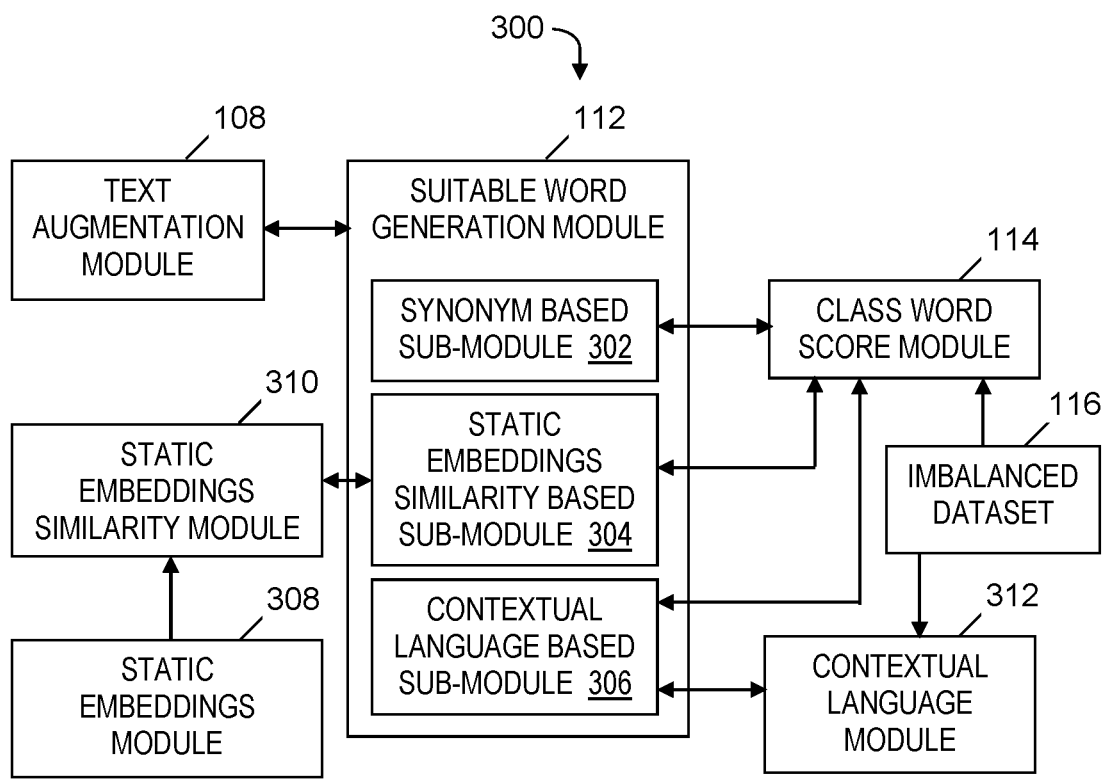
FIG. 3 is a block diagram of a system for generating word(s) that are suitable replacements for a given word, where the system is implemented within the system of FIG. 1, in accordance with embodiments of the present invention.

In one or more embodiments, system 100 includes the components of system 200 in FIG. 2 and the components of system 300 in FIG. 3.

The functionality of the components shown in FIG. 1 is described in more detail in the discussion of FIG. 2, FIG. 3, FIG. 4, FIG. 5, FIGS. 6A-6B, FIGS. 7A-7B, FIGS. 8A-8B, and FIG. 9 presented below.

FIG. 2 is a block diagram of a system 200 for determining words in a text record that can be replaced, where the system is implemented within the system of FIG. 1, in accordance with embodiments of the present invention. System 200 includes word priority module 110, class word score module 114, and the following software-based modules: a part of speech (POS) module 202, a stop word module 204, and a dependency module 206.

Word priority module 110 identifies words in the text record that can be replaced and in what order the identified words can be replaced. Word priority module 110 receives a text record from text augmentation module 108 (see FIG. 1) and sends the text record to class word score module 114, POS module 202, stop word module 204, and dependency module 206. Class word score module 114 returns class word scores to word priority module 110. POS module returns POS scores to word priority module 110. Stop word module returns stop word scores to word priority module 110. Dependency module 206 returns dependency scores to word priority module 110.

For a given word in the received text record, word priority module 110 weights the class word score, the POS score, the stop word score, and the dependency score with different respective weights, and then calculates a word priority score by adding the aforementioned weighted scores. Word priority module 110 determines whether the word priority score exceeds a defined threshold score. If the word priority score exceeds the threshold score, word priority module 110 adds the word corresponding to the word priority score to a word priority list, which is a list of words that can be replaced to create an augmented text record. After similarly processing the other words in the received text record, word priority module 110 sends the resulting word priority list to text augmentation module 108 (see FIG. 1).

POS module 202 uses a POS tagger model (not shown) to generate respective POS scores of the words in the text record. The POS tagger model determines respective lexical categories of the words in the text record.

Stop word module 204 uses a stop word list (not shown) to generate respective stop word scores of the words in the text record. The stop word list includes stop words, which are words that are commonly used words in a natural language (e.g., "a," "an," "the," etc.) and which add little or no value to text classification.

Dependency module 206 uses a dependency parser model (not shown) to generate respective dependency scores for the words in the text record. The dependency parser model determines a syntactic dependency relationship between the words of the text record by analyzing the grammatical structure of the sentences that include the words.

The functionality of the components shown in FIG. 2 is described in more detail in the discussion of FIG. 4, FIG. 5, FIGS. 6A-6B, FIGS. 7A-7B, FIGS. 8A-8B, and FIG. 9 presented below.

FIG. 3 is a block diagram of a system 300 for generating word(s) that are suitable replacements for a given word in the word priority list generated by system 200 (see FIG. 2), where system 300 is implemented within the system of FIG. 1, in accordance with embodiments of the present invention. System 300 includes suitable word generation module 112, which includes a synonym based sub-module 302, a static embeddings similarity based sub-module 304, and a contextual language based sub-module 306. System 300 also includes text augmentation module 108, class word score module 114, imbalanced dataset 116, and the following software-based modules: a static embeddings module 308, a static embeddings similarity module 310, and a contextual language module 312.

Suitable word generation module 112 generates a suitable word list that includes word(s) that are suitable replacements for a given word by considering cosine similar word embeddings with class-based word importance statistics, synonyms with class-based word importance statistics, and contextual words with class-based word importance statistics. Suitable word generation module 112 receives from text augmentation module 108 the word priority list and the corresponding text record. Suitable word generation module 112 sends the word priority list to synonym based sub-module 302, which returns suitable word scores corresponding to the words in the word priority list. Suitable word generation module 112 sends the word priority list to static embeddings similarity module 310, and in response receives similar words (i.e., words similar to the words in the word priority list) and cosine similarity scores of the similar words. Suitable word generation module 112 sends the word priority list and the corresponding text record to contextual language module 312, and in response receives likely words (i.e., words that are contextually relevant to words in the word priority list) and probability scores of the likely words.

Static embeddings module 308 generates top k similar tokens for a given token in the vocabulary of a transfer learning based static embeddings model. Static embeddings module 308 sends a static embeddings similarity list to static embeddings similarity module 310. The static embeddings similarity list includes the top k similar tokens and their cosine similarity scores.

Static embeddings similarity module generates top k similar words for a given word in a word priority list using the static embeddings model. Static embeddings similarity module 310 sends the aforementioned similar words and cosine similarity scores of the similar words to static embeddings similarity based sub-module 304. Class word score module 114 sends class word scores to static embeddings similarity based sub-module 304. Using the cosine similarity scores and the class word scores, static embeddings similarity based sub-module 304 generates suitable word scores.

Contextual language module 312 generates top j likely words for a given word by using a contextual language model. Contextual language module 312 sends likely words and contextual probability scores of the likely words to contextual language based sub-module 306. Class word score module 114 sends class word scores to contextual language based sub-module 306. Using the contextual probability scores and the class word scores, contextual language based sub-module 306 generates suitable word scores.

Class word score module 114 sends class word scores to synonym based sub-module 302. Using the class word scores, synonym based sub-module 302 generates suitable word scores.

The functionality of the components shown in FIG. 3 is described in more detail in the discussion of FIG. 4, FIG. 5, FIGS. 6A-6B, FIGS. 7A-7B, FIGS. 8A-8B, and FIG. 9 presented below.

Process for Augmenting Text of a Small Class

Figure 4:
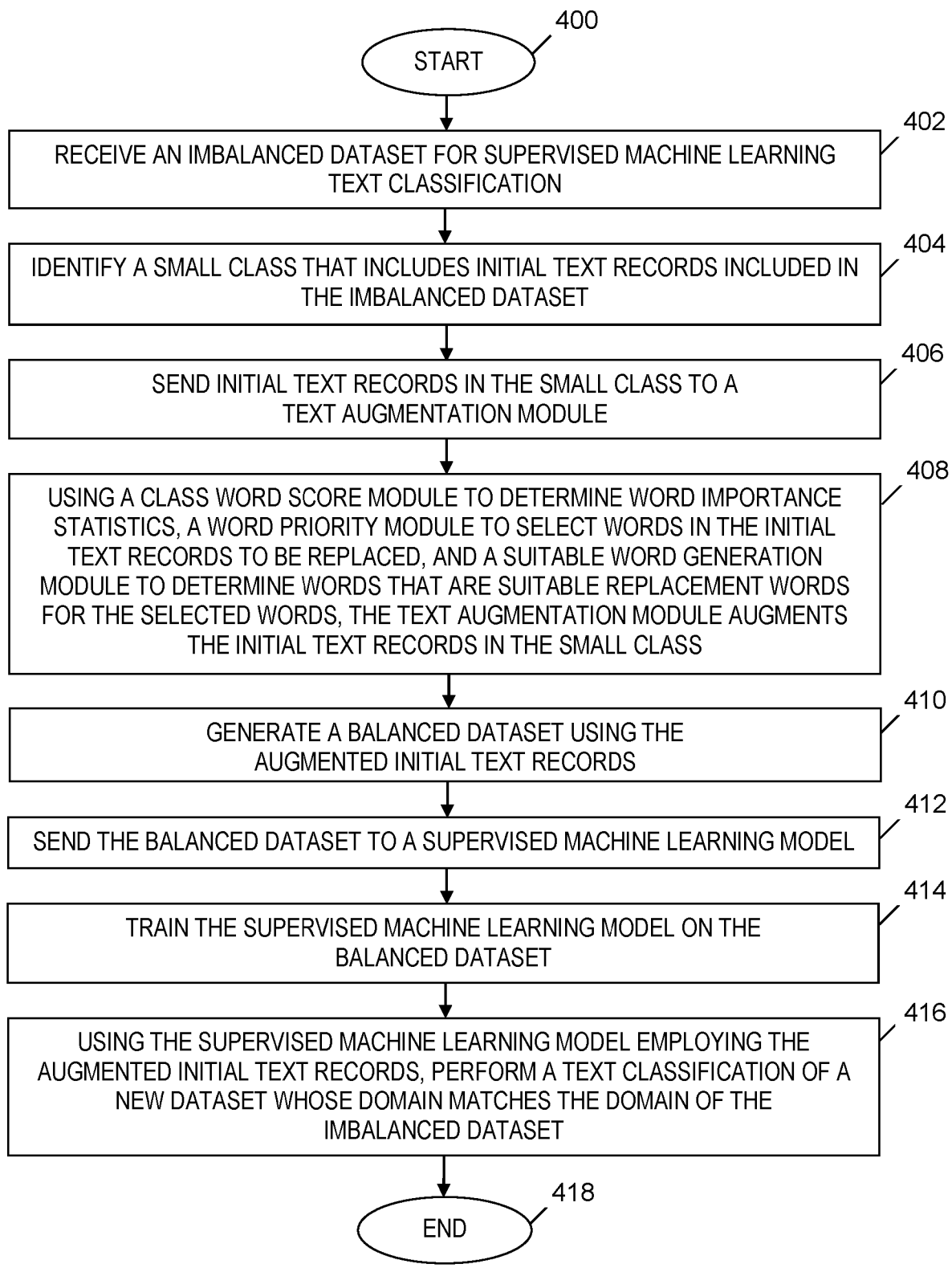
FIG. 4 is a flowchart of a process of augmenting text of a small class, where the process is implemented in the system of FIG. 1, in accordance with embodiments of the present invention.

FIG. 4 is a flowchart of a process of augmenting text of a small class, where the process is implemented in the system of FIG. 1, in accordance with embodiments of the present invention. The process of FIG. 4 begins at a start node 400. In step 402, small class text augmentation system 104 (see FIG. 1) receives imbalanced dataset 116 (see FIG. 1) for supervised machine learning text classification.

In step 404, small class text augmentation system 104 (see FIG. 1) (1) obtains text records in imbalanced dataset 116 (see FIG. 1) and classes of the text records by reading imbalanced dataset 116 (see FIG. 1); (2) obtains counts of text records in each of the classes; and (3) identifies a class having the lowest count of text records (i.e., identifies a small class). Hereinafter, text records in the small class identified in step 404 are referred to as initial text records. In one embodiment, main module 106 performs step 404.

In step 406, main module 106 (see FIG. 1) sends the initial text records in the identified small class to text augmentation module 108 (see FIG. 1).

In step 408, text augmentation module 108 (see FIG. 1) augments the initial text records in the small class (also known as text augmentation of the small class). The augmentation of the initial text records includes generating new augmented text records and adding the new augmented text records to the initial text records.

Text augmentation module 108 (see FIG. 1) generates the new augmented text records by using (1) class word score module 114 to determine word importance statistics, (2) word priority module 110 (see FIG. 1) to select words in the initial text records, where the selected words are to be replaced to generate new augmented text records, and (3) suitable word generation module 112 (see FIG. 1) to determine respective sets of word(s) that are suitable replacement word(s) for the aforementioned selected words.

Step 408 also includes text augmentation module 108 (see FIG. 1) sending the new augmented initial text records to main module 106 (see FIG. 1).

Additional details of step 408 are described below in the discussions of FIG. 5, FIGS. 6A-6B, FIGS. 7A-7B, and FIGS. 8A-8B.

In step 410, small class text augmentation system 104 (see FIG. 1) generates balanced dataset 118 (see FIG. 1) by adding the augmented initial text records to the original text records that had been in imbalanced dataset 116 (see FIG. 1). In one embodiment, main module 106 (see FIG. 1) performs step 410.

In step 412, small class text augmentation system 104 (see FIG. 1) sends the balanced dataset 118 (see FIG. 1) to a supervised machine learning model. In one embodiment, main module 106 (see FIG. 1) performs step 412. In step 414, small class text augmentation system 104 (see FIG. 1) trains the supervised machine learning model on balanced dataset 118 (see FIG. 1).

In step 416, using the supervised machine learning model, which is employing the augmented initial text records, small class text augmentation system 104 (see FIG. 1) performs a text classification of a new dataset whose domain matches a domain of the imbalanced dataset 116 (see FIG. 1).

The process of FIG. 4 ends at an end node 418.

Figure 5:
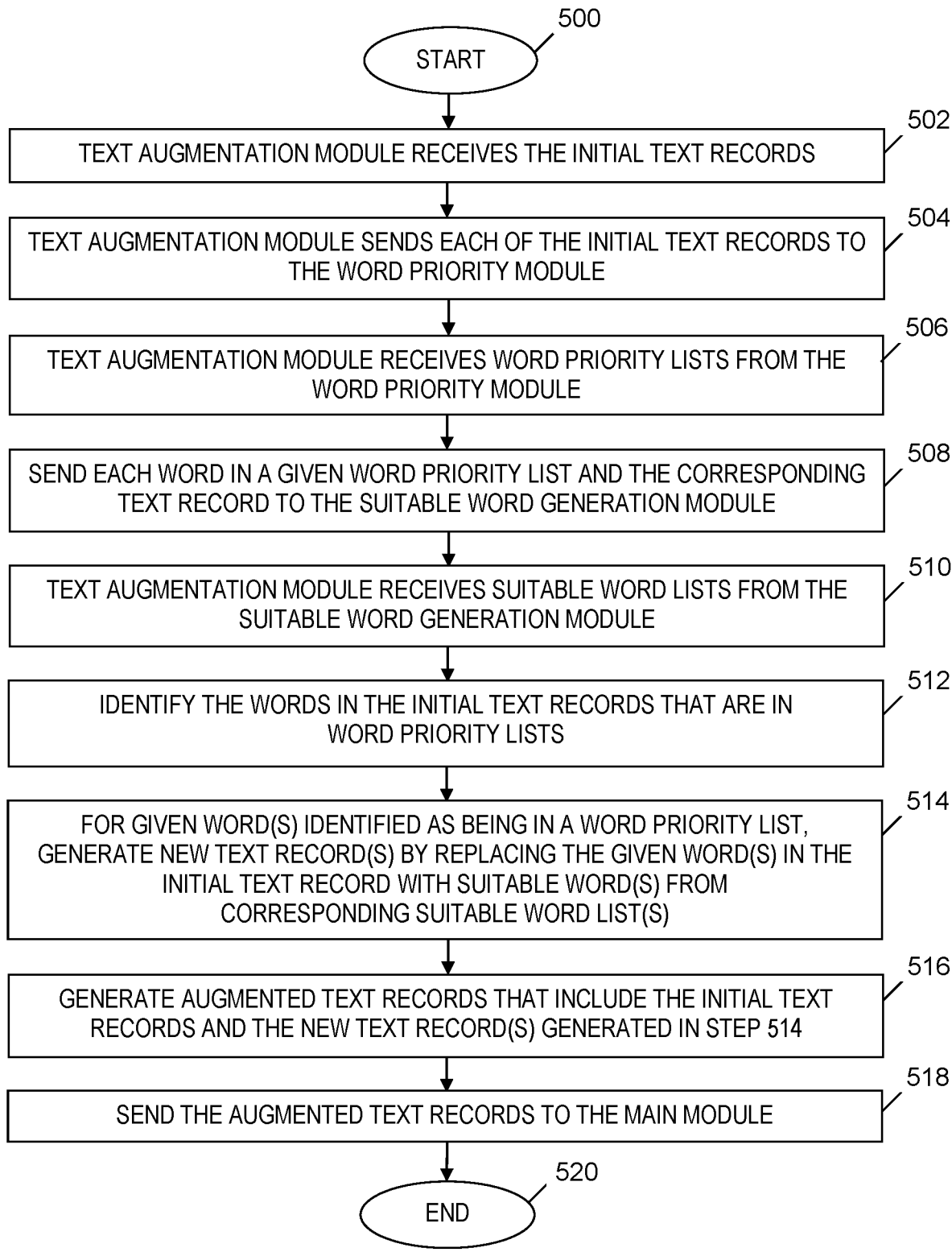
FIG. 5 is a flowchart of a process performed by a text augmentation module included in the systems of FIG. 1 and FIG. 3, where the process is included in the process of FIG. 4, in accordance with embodiments of the present invention.

FIG. 5 is a flowchart of a process performed by a text augmentation module included in the systems of FIG. 1 and FIG. 3, where the process is included in the process of FIG. 4, in accordance with embodiments of the present invention. The process of FIG. 5 begins at a start node 500. In step 502, text augmentation module 108 (see FIG. 1) receives the initial text records in the small class from main module 106 (see FIG. 1).

Figure 6A:
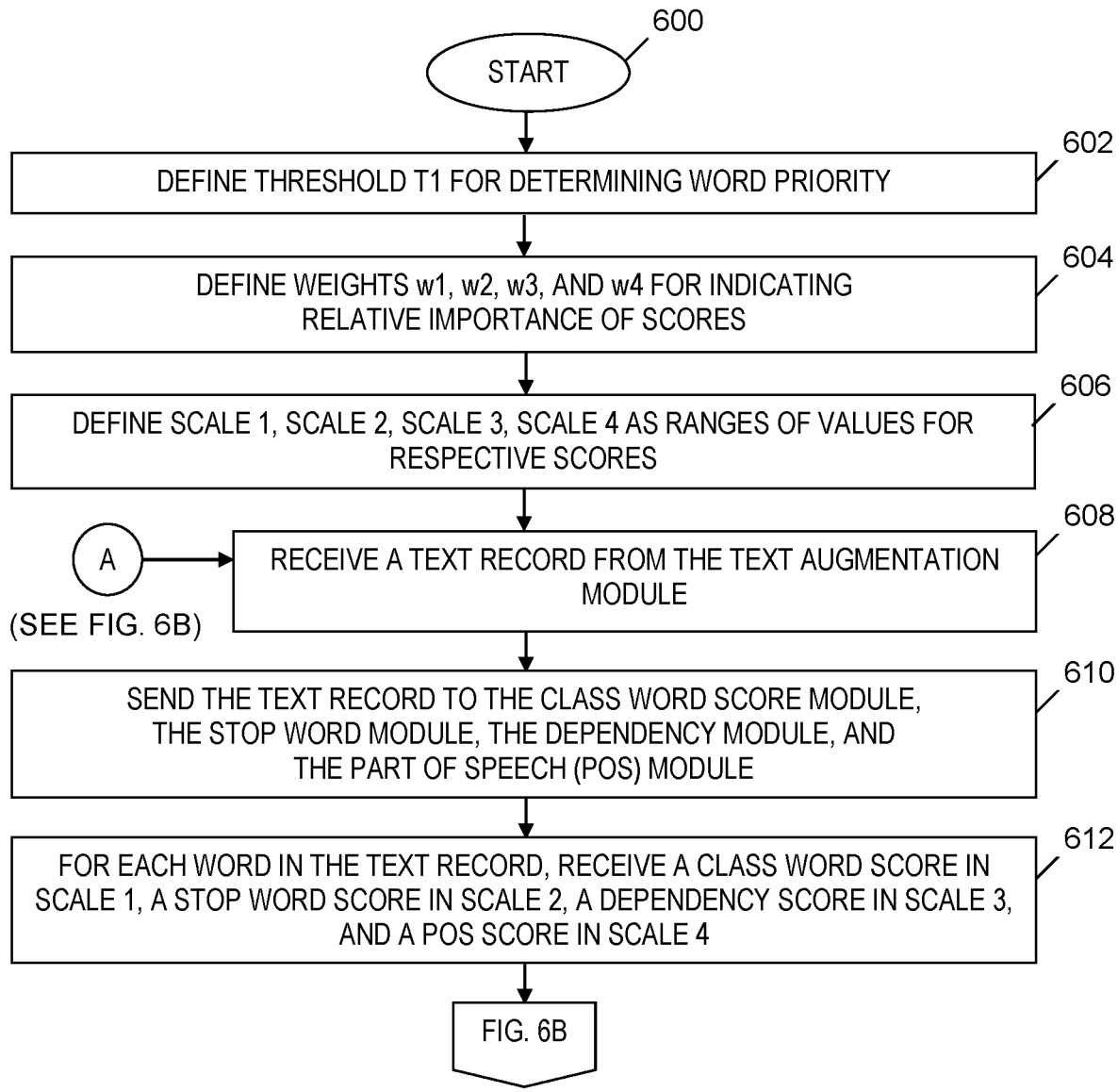
FIGS. 6A-6B depict a flowchart of a process performed by a word priority module included in the systems of FIG. 1 and FIG. 2, where the process is included in the process of FIG. 4, in accordance with embodiments of the present invention.
Figure 6B:
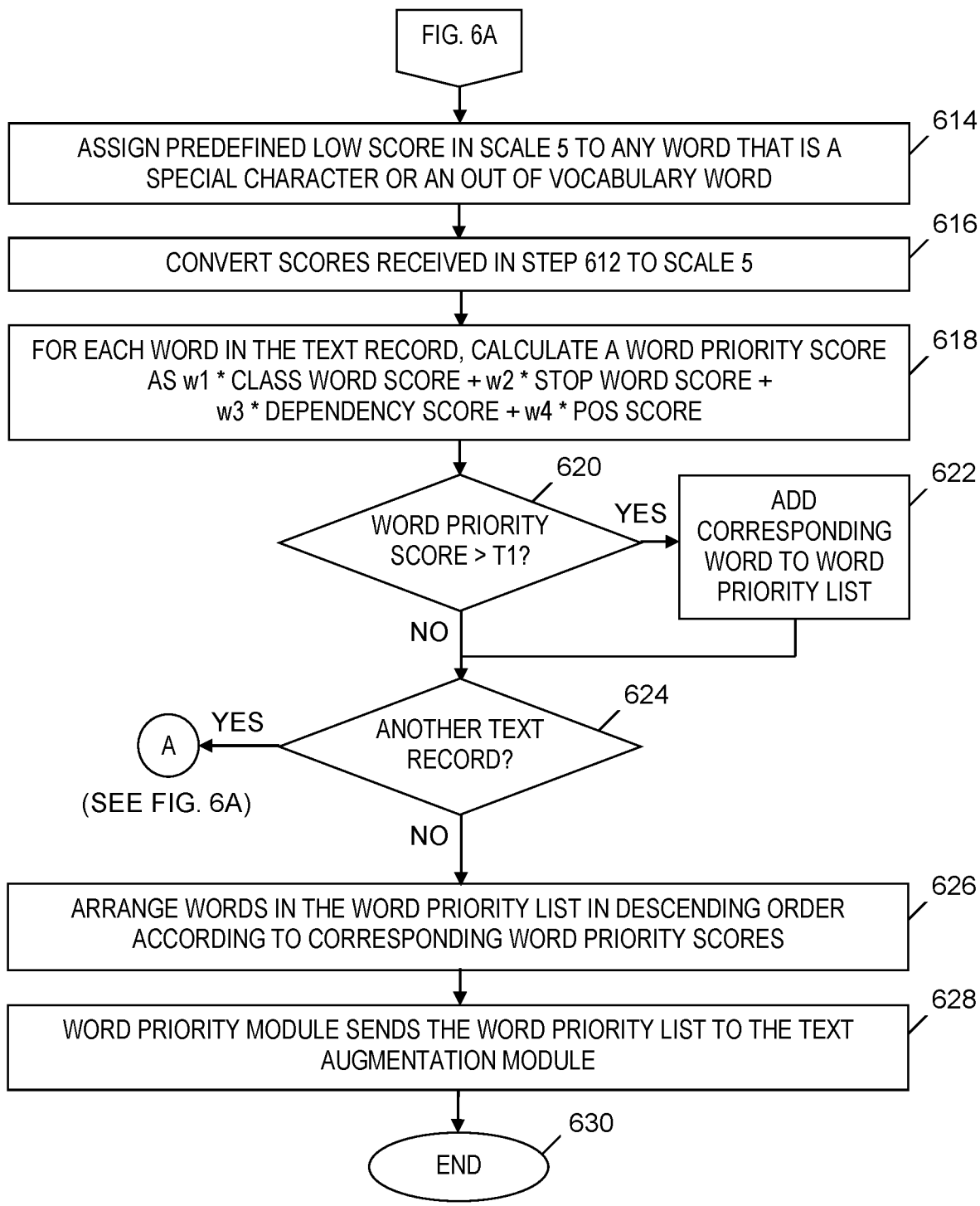

In step 504, text augmentation module 108 (see FIG. 1) sends each of the initial text records to word priority module 110 (see FIG. 1) (i.e., sends each text record of the small class to word priority module 110 (see FIG. 1)). Details of the processing of the initial text records by word priority module 110 (see FIG. 1) are included in the discussion of FIGS. 6A-6B, presented below.

In step 506, text augmentation module 108 (see FIG. 1) receives word priority lists generated by word priority module 110 (see FIG. 1), where the word priority lists are associated with the initial text records in a one-to-one correspondence.

Figure 8A:
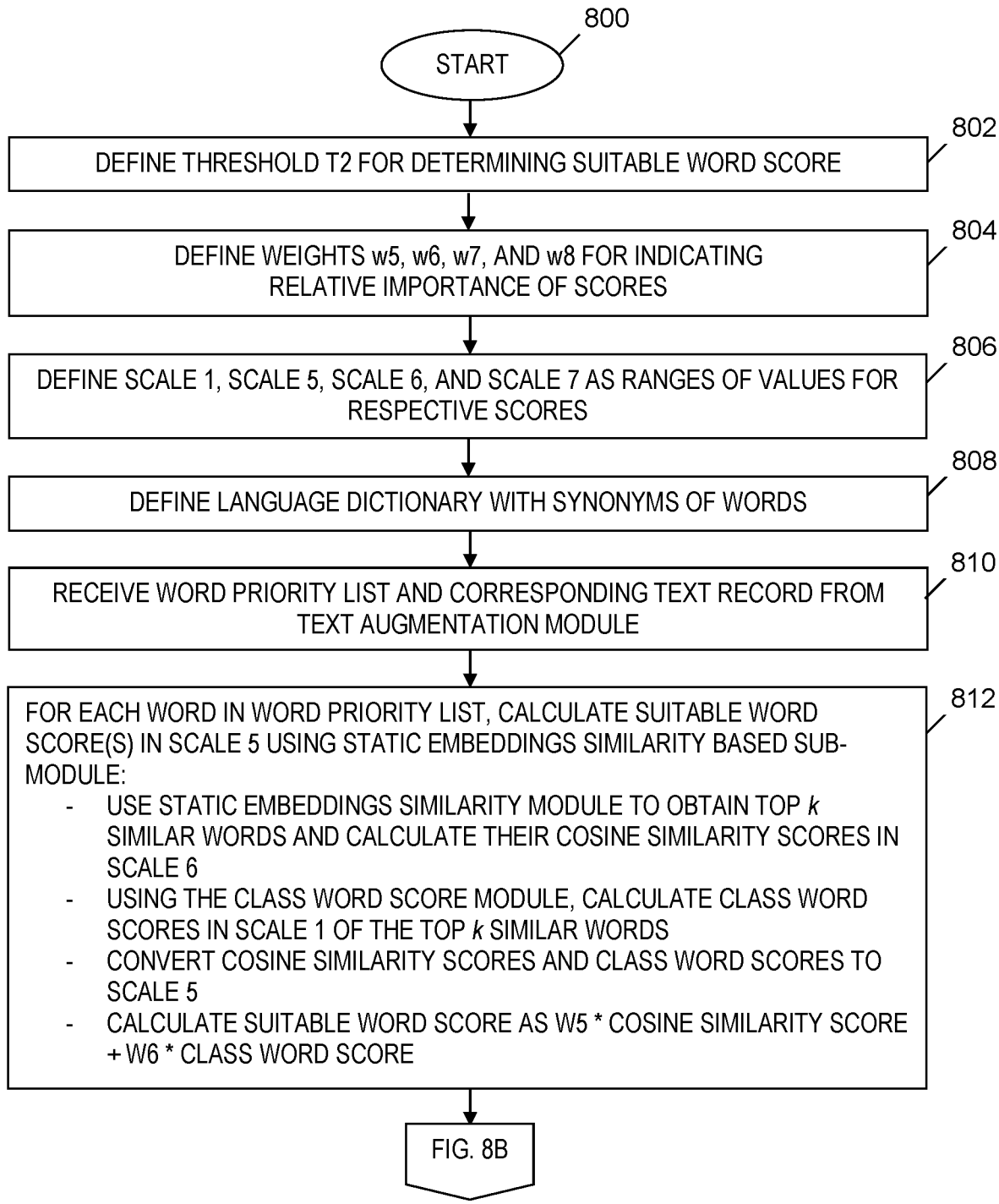
FIGS. 8A-8B depict a flowchart of a process performed by a suitable word generation module included in the systems of FIG. 1 and FIG. 3, where the process is included in the process of FIG. 4, in accordance with embodiments of the present invention.
Figure 8B:
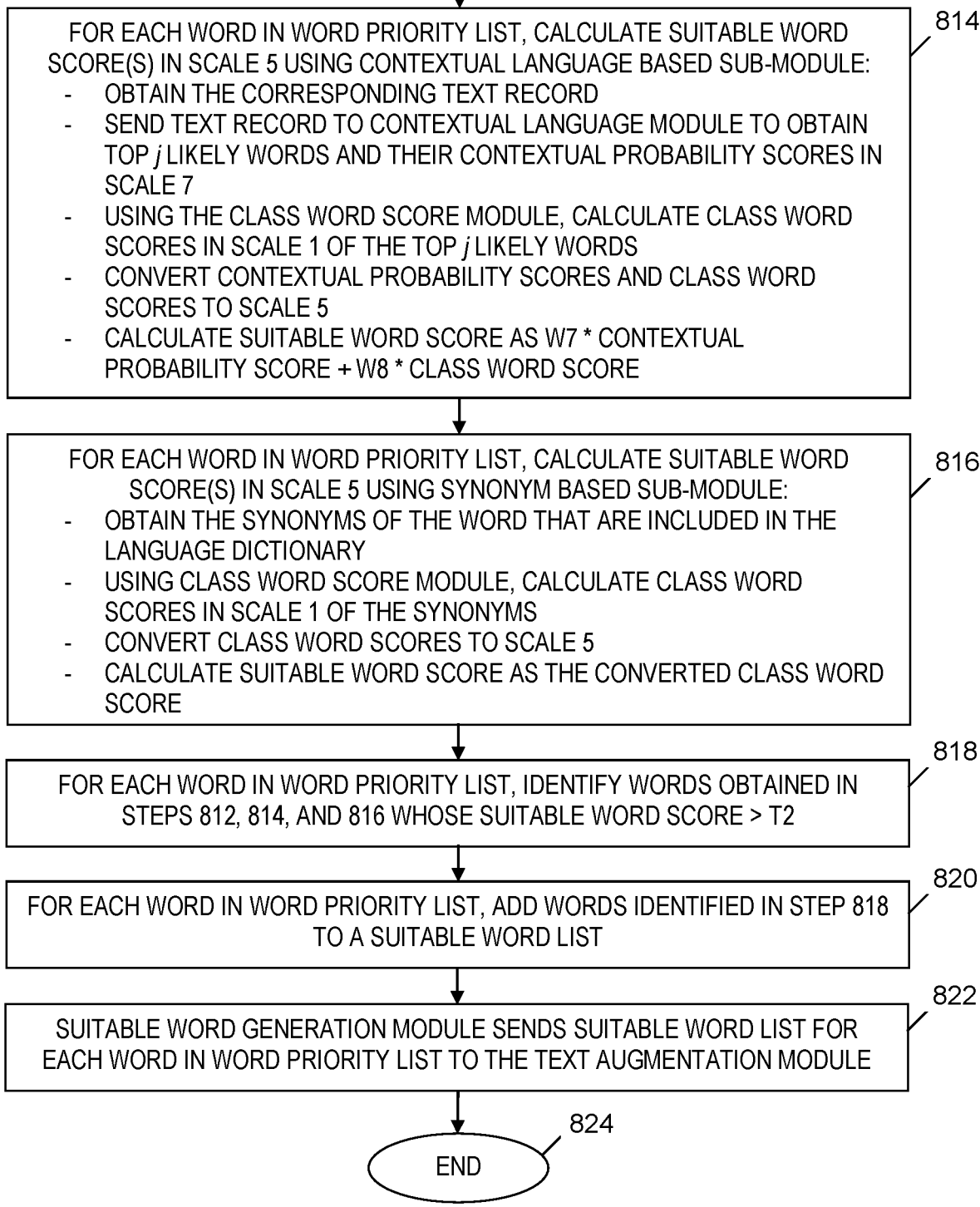

In step 508, text augmentation module 108 (see FIG. 1) sends each word in a given word priority list and the corresponding text record to suitable word generation module 112 (see FIG. 1). Details of the processing of the word priority list and corresponding text record by suitable word generation module 112 (see FIG. 1) are included in the discussion of FIGS. 8A-8B, presented below.

In step 510, text augmentation module 108 (see FIG. 1) receives suitable word lists from suitable word generation module 112 (see FIG. 1), where the suitable word lists are associated with the words in the word priority lists in a one-to-one correspondence. A given suitable word list includes word(s) that are suitable replacement word(s) for a given word in a word priority list generated by word priority module 110 (see FIG. 1).

In step 512 text augmentation module 108 (see FIG. 1) identifies the words in the initial text records that are in the word priority lists generated by word priority module 110 (see FIG. 1).

In step 514 and for given word(s) that are in an initial text record and are identified as being in a word priority list in step 512, text augmentation module 108 (see FIG. 1) generates new text record(s) by replacing the given word(s) in the initial text record with suitable word(s) from the corresponding suitable word list(s). In one embodiment, the number of new text records generated may be more than the number of words in the corresponding suitable word list. In one embodiment, text augmentation module 108 (see FIG. 1) ensures that no combination of words from the corresponding word priority list is repeated while generating new text record(s) in step 514.

In step 516, text augmentation module 108 (see FIG. 1) generates augmented text records that include the initial text records and the new text record(s) generated in step 514.

In step 518, text augmentation module 108 (see FIG. 1) sends the augmented text records to main module 106 (see FIG. 1).

In one embodiment, step 408 (see FIG. 4) includes steps 504, 506, 508, 510, 512, 514, and 516.

The process of FIG. 5 ends at an end node 520.

FIGS. 6A-6B depict a flowchart of a process performed by a word priority module included in the systems of FIG. 1 and FIG. 2, where the process is included in the process of FIG. 4, in accordance with embodiments of the present invention. The process of FIGS. 6A-6B includes word priority module 110 (see FIG. 1) performing the following actions:

(1) determines which words in the text record are to be replaced;

(2) selects the right word and the right position in a sentence in a given text record by considering a weighted average of lexical features (i.e., parts of speech), syntactic features (i.e., dependency tag), word frequency statistics (i.e., class word score), and a stop word score; and (3) generates a word priority list for the given text record.

The process of FIGS. 6A-6B begins a start node 600 in FIG. 6A. In step 602, word priority module 110 (see FIG. 1) defines a threshold score T1 for determining word priority.

In step 604, word priority module 110 (see FIG. 1) defines weights w1, w2, w3, and w4 for indicating the relative importance of scores.

In step 606, word priority module 110 (see FIG. 1) defines the following scales as ranges of values for respective scores: scale 1, scale 2, scale 3, and scale 4.

In step 608, word priority module 110 (see FIG. 1) receives a text record from text augmentation module 108 (see FIG. 1).

In step 610, word priority module 110 (see FIG. 1) sends the text record received in step 608 to class word score module 114 (see FIG. 1), stop word module 204 (see FIG. 2), dependency module 206 (see FIG. 2), and POS module 202 (see FIG. 2).

In response to receiving the text record sent by word priority module 110 (see FIG. 1), POS module 202 (see FIG. 2) performs the following actions:
(1) obtain a POS tagger model, which provides lexical categories of words in the text record;
(2) send entire text record to the POS tagger model;
(3) for each word in the text record, (i) obtain the POS tag from the POS tagger model and (ii) determine a POS score by assigning respective numeric values in scale 4 to the POS tags, where the numeric values determine the importance of the different POS tags; and
(4) return entire text record along with the POS scores in scale 4 for the words in the text record In response to receiving the text record sent by word priority module 110 (see FIG. 1), dependency module 206 (see FIG. 2) performs the following actions:
(1) obtain a dependency parser model, which provides syntactic dependency relationships between words in the text record;
(2) send the entire text record to the dependency parser model;
(3) for each word in the text record, (i) obtain a dependency tag from the dependency parser model and (ii) determine a dependency score by assigning numeric values in scale 3 to the dependency tags, where the numeric values determine the importance of the different dependency tags; and
(4) return the entire text record along with the dependency scores in scale 3 for the words in the text record In response to receiving the text record sent by word priority module 110 (see FIG. 1), stop word module 204 (see FIG. 2) performs the following actions:
(1) define a stop word list of words that add little or no value to text classification;
(2) for each word in the text record, assign a predefined low stop word score if the word is present in the stop word list or assign a predefined high stop word score if the word is not present in the stop word list; and
(3) return the stop word scores in scale 2

In one embodiment, stop word module 204 (see FIG. 2) assigns respective pairs of numeric values (low, high) in scale 2 to the classes of the text records, where a pair for a given class has a low value for assignment to a word that is present in the stop word list and a high value for assignment to a word that is not present in the stop word list.

In step 612, for each word in the text record received in step 608, word priority module 110 (see FIG. 1) receives a class word score in scale 1, a stop word score in scale 2, a dependency score in scale 3, and a POS score in scale 4.

After step 612, the process of FIGS. 6A-6B continues with step 614 in FIG. 6B.

Prior to step 614 and for each word in the text record received in step 608 (see FIG. 6A), word priority module 110 (see FIG. 1) determines whether the word in the text record received in step 608 (see FIG. 6A) is a special character or an out of vocabular word. In step 614, word priority module 110 (see FIG. 1) assigns a predefined low score in scale 5 to any word that was determined to be a special character or an out of vocabulary word.

In step 616, word priority module 110 (see FIG. 1) converts the scores received in step 612 (see FIG. 6A) to scale 5.

In step 618 and for each word in the text record received in step 608 (see FIG. 6A), word priority module 110 (see FIG. 1) calculates a corresponding word priority score as w1*class word score+w2*stop word score+w3*dependency score+w4*POS score.

In step 620, word priority module 110 (see FIG. 1) determines whether each of the word priority scores calculated in step 618 is greater than threshold score T1. If word priority module 110 (see FIG. 1) determines in step 620 that a given word priority score calculated in step 618 is greater than threshold score T1, then the Yes branch of step 620 is taken and step 622 is performed. In step 622, word priority module 110 (see FIG. 1) adds the word corresponding to the given word priority score calculated in step 618 to a word priority list. The repeated performance of step 622 generates a final word priority list to be sent to text augmentation module 108 (see FIG. 1). After step 622, step 624 is performed.

Returning to step 620, if word priority module 110 (see FIG. 1) determines that the word priority score is not greater than threshold score T1, then the No branch of step 620 is taken and step 624 is performed.

In step 624, word priority module 110 (see FIG. 1) determines whether another text record remains to be processed by the process of FIGS. 6A-6B. If word priority module 110 (see FIG. 1) determines in step 624 that another text record remains to be processed, then the Yes branch of step 624 is taken and the process loops back to step 608 (see FIG. 6A).

Returning to step 624, if word priority module 110 (see FIG. 1) determines that no other text record remains to be processed by the process of FIGS. 6A-6B, then the No branch of step 624 is taken and step 626 is performed.

In step 626, word priority module 110 (see FIG. 1) arranges words in the word priority list in descending order according to corresponding word priority scores.

In step 628, word priority module 110 (see FIG. 1) sends the word priority list to text augmentation module 108 (see FIG. 1).

The process of FIGS. 6A-6B ends at an end node 630.

In one embodiment, the process of FIGS. 6A-6B is performed between steps 504 and 506 in FIG. 5.

Figure 7A:
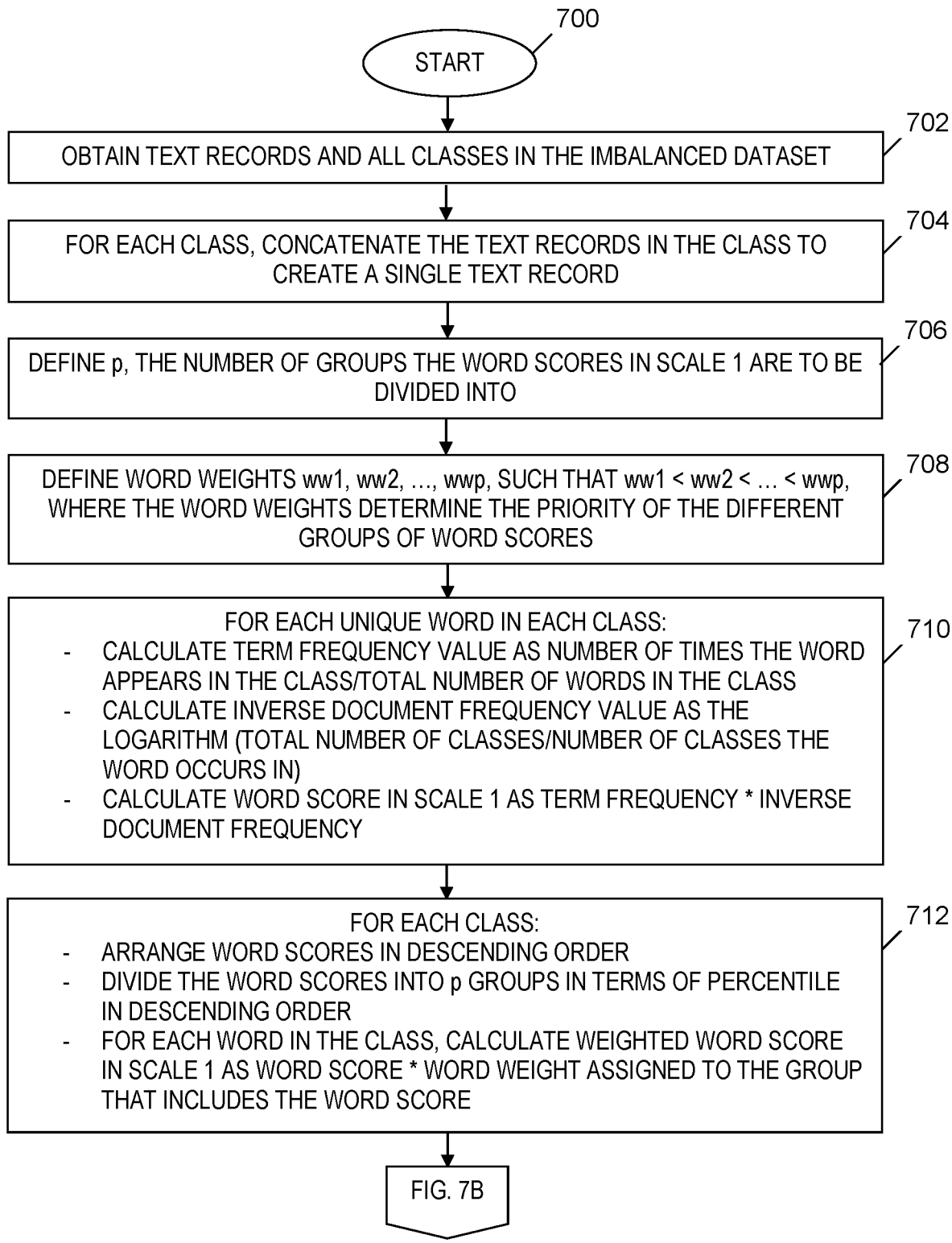
FIGS. 7A-7B depict a flowchart of a process performed by a class word score module included in the systems of FIG. 1, FIG. 2, and FIG. 3, where the process is included in the process of FIG. 4, in accordance with embodiments of the present invention.
Figure 7B:
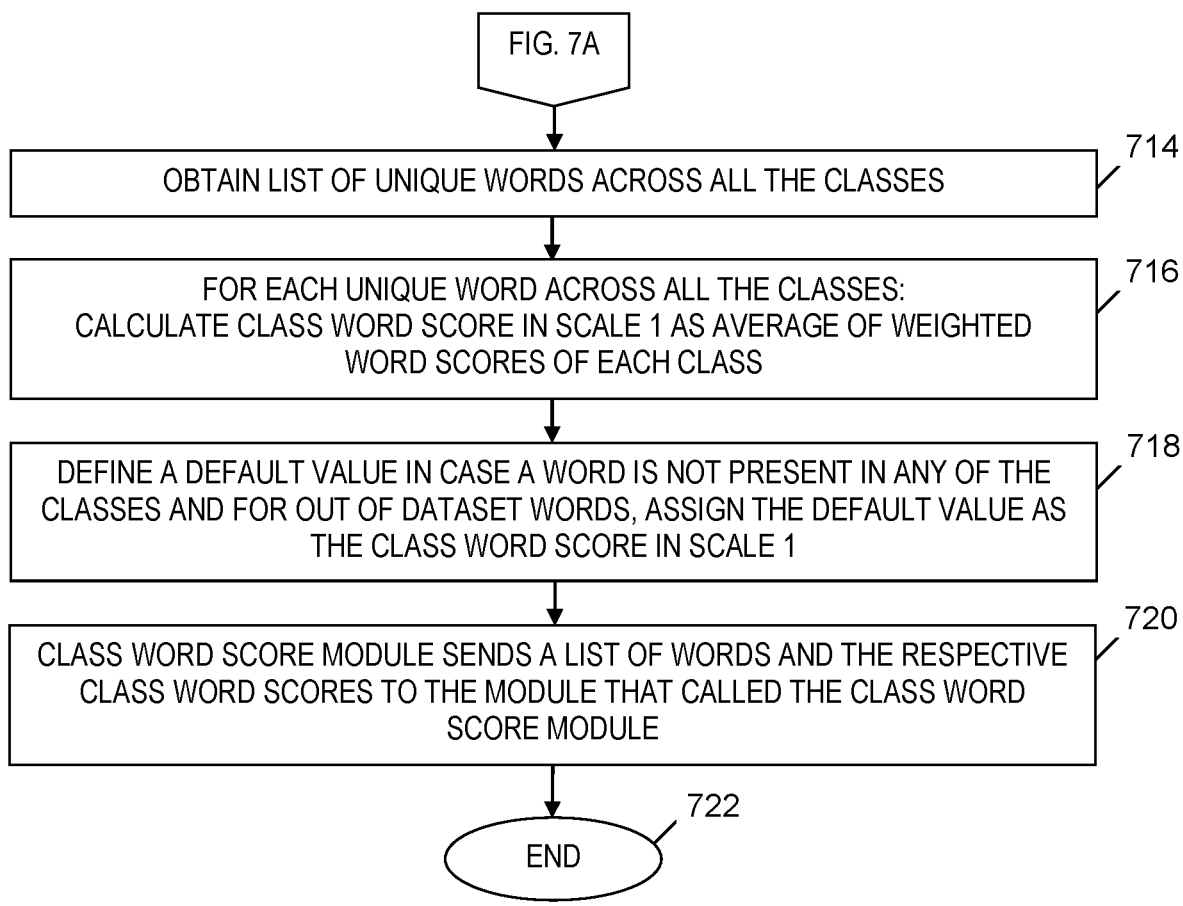

FIGS. 7A-7B depict a flowchart of a process performed by a class word score module included in the systems of FIG. 1, FIG. 2, and FIG. 3, where the process is included in the process of FIG. 4, in accordance with embodiments of the present invention. In the process of FIGS. 7A-7B, class word score module 114 (see FIG. 1) performs the following:
(1) provides word importance statistics from a class point of view;
(2) considers word frequency scores and a unique weighting mechanism to maintain class-specific word structure, while avoiding the introduction of words important for one class into another class;
(3) groups word scored in terms of percentiles in descending order, generates weighted word scores, and calculates a final class word score for each unique word as an average of weighted word scores in scale 1 of each class;
(4) penalizes words with high term frequency and high document frequency (i.e., the word appears in all classes)
(5) replaces words that are not common to all classes and also not important to one class; and (6) avoids (i) the introduction of unnecessary bias into the supervised text classification model and (ii) a reduction of the performance of the supervised text classification model The process of FIGS. 7A-7B begins at a start node 700. In step 702, class word score module 114 (see FIG. 1) obtains all classes and the text records of the classes, where the text records are included in imbalanced dataset 116 (see FIG. 1).

In step 704 and for each class in imbalanced dataset 116 (see FIG. 1), class word score module 114 (see FIG. 1) concatenates the text records in the class to create a single text record.

In step 706, class word score module 114 (see FIG. 1) defines p, the number of groups into which the word scores in scale 1 are to be divided.

In step 708, class word score module 114 (see FIG. 1) defines word weights ww1, ww2, . . . wwp, such that ww1<ww2< . . . <wwp, where the word weights determine the priority of the different groups of word scores.

In step 710 and for each unique word in each class, class word score module 114 (see FIG. 1) performs the following actions:
(1) calculate a term frequency value as the number of times the word appears in the class/total number of words in the class;
(2) calculate an inverse document frequency value as the logarithm (total number of classes/number of classes in which the word occurs); and
(3) calculate a word score in scale 1 for the word as term frequency value*inverse document frequency value In step 712 and for each class, class word score module 114 (see FIG. 1) performs the following actions:
(1) arrange the word scores in descending order;
(2) divide the word scores into p groups in terms of percentile in terms of descending order; and
(3) for each word in the class, calculate weighted word score in scale 1 as word score*word weight assigned to the group that includes the word score (i.e., multiply word score of one group with the weights assigned to that same group) (e.g., the word score in the highest percentile group is multiplied with word weight ww1, which has the lowest word weight value)

After step 712, the process of FIGS. 7A-7B continues with step 714 in FIG. 7B.

In step 714, class word score module 114 (see FIG. 1) obtains a list of unique words across all the classes in the imbalanced dataset 116 (see FIG. 1).

In step 716 and for each unique word across all the classes, class word score module 114 (see FIG. 1) calculates a class word score in scale 1 for the word as an average of weighted word scores of each class.

In step 718, class word score module 114 (see FIG. 1) defines a default value in case a word is not present in any of the classes and for out of dataset words, class word score module 114 (see FIG. 1) assigns the default value as the class word score in scale 1.

In step 720, class word score module 114 (see FIG. 1) sends a list of words and the respective class word scores to the module that called the class word score module 114 (see FIG. 1). For example, in step 720. class word score module 114 (see FIG. 1) sends the list of words and the respective class word scores to word priority module 110 (see FIG. 1).

After step 720, class word score module 114 (see FIG. 1) ends at an end node 722.

In one embodiment, the process of FIGS. 7A-7B is performed between steps 610 and 612 in FIGS. 6A-6B.

FIGS. 8A-8B depict a flowchart of a process performed by a suitable word generation module included in the systems of FIG. 1 and FIG. 3, where the process is included in the process of FIG. 4, in accordance with embodiments of the present invention. The process of FIGS. 8A-8B includes suitable word generation module 112 (see FIG. 1) performing the following actions:
(1) determines the right replacement word(s); and
(2) generates a suitable word list as a replacement(s) for a given word by considering a weighted average of (i) cosine similar word embeddings with class-based word importance statistics, (ii) context specific words with class-based word importance statistics, and (iii) synonyms from a language dictionary with class-based importance statistics.

The process of FIGS. 8A-8B begins at a start node 800. In step 802, suitable word generation module 112 (see FIG. 1) defines a threshold score T2 for determining a suitable word score.

In step 804, suitable word generation module 112 (see FIG. 1) defines weights w5, w6, w7, and w8 for indicating a relative importance of scores.

In step 806, suitable word generation module 112 (see FIG. 1) defines scale 1, scale 5, scale 6, and scale 7 as ranges of values for respective scores.

In step 808, suitable word generation module 112 (see FIG. 1) defines a language dictionary that includes synonyms of words.

In step 810, suitable word generation module 112 (see FIG. 1) receives a word priority list and a text record corresponding to the word priority list from text augmentation module 108 (see FIG. 1).

In step 812 and for each word in the word priority list received in step 810, suitable word generation module 112 (see FIG. 1) calculates suitable word score(s) in scale 5 using static embeddings similarity based sub-module 304 (see FIG. 3) to perform the following actions:
(1) using static embeddings similarity module 310 (see FIG. 3), obtain top k similar words and calculate the cosine similarity scores in scale 6 for the top k similar words
(2) using the class word score module 114 (see FIG. 1), calculate class word scores in scale 1 of the top k similar words;
(3) convert cosine similarity scores and class word scores to scale 5; and
(4) for each of the top k similar words, calculate a suitable word score as w5*cosine similarity score+w6*class word score In one embodiment, using the static embeddings similarity module 310 (see FIG. 3) generates top k similar words for a given word in the word priority list using a static embeddings model and includes performing the following actions:
(1) obtain a pretrained transfer learning based static embeddings model;
(2) obtain a pretrained transfer learning based static embeddings model tokenizer;
(3) obtain the static embeddings similarity list from static embeddings module 308 (see FIG. 3), where the actions of the static embeddings module 308 are described below;
(4) obtain the word priority list from suitable word generation module 112 (see FIG. 1);
(5) for each word in the word priority list, (i) tokenize the word using the static embeddings model tokenizer to generate a token, (ii) using the token, obtain the top k similar tokens and their cosine similarity scores from the static embeddings similarity list, and (iii) convert the top k similar tokens to top k similar words using the in-built function of the static embeddings model;
(6) return the word priority list and the corresponding top k similar words and their cosine similarity scores to the suitable word generation module 112 (see FIG. 1).

In one embodiment, static embeddings module 308 generates top k similar tokens for a given token in the vocabulary of a static embeddings model by performing the following actions:
(1) obtain the pretrained transfer learning based static embeddings model;
(2) obtain the vocabulary of the static embeddings model (i.e., tokens and their corresponding index identifiers (IDs));
(3) define k, the number of similar words for a given word;
(4) for each token in the vocabulary, (i) obtain the corresponding index ID, (ii) obtain static embeddings for each index ID from in-built functions of the static embeddings model, (iii) calculate cosine similarity between the current token's static embeddings and the static embeddings of all the other tokens, and (iv) generate a static embeddings similarity list of top k similar tokens along with their cosine similarity scores and arrange the list in descending order according to the cosine similarity score
(5) save the static embeddings similarity list for all the tokens in the vocabulary; and
(6) send the static embeddings similarity list to static embeddings similarity module 310

After step 812, the process of FIGS. 8A-8B continues with step 814 in FIG. 8B.

In step 814 and for each word in the word priority list received in step 810 (see FIG. 8A), suitable word generation module 112 (see FIG. 1) calculates suitable word score(s) in scale 5 using contextual language based sub-module 306 (see FIG. 3) to perform the following actions:
(1) obtain the text record corresponding to the word priority list;
(2) send the text record to contextual language module 312 (see FIG. 3) and in response, obtain top j likely words and contextual probability scores in scale 7 of the top j likely words;
(3) using the class word score module 114 (see FIG. 1), suitable word generation module 112 (see FIG. 1) calculates class word scores in scale 1 of the top j likely words
(4) convert contextual probability scores and class word scores to scale 5;
(5) for each of the top j likely words, calculate a suitable word score as w7*contextual probability score+ w8*class word score In one embodiment, class language module 312 (see FIG. 3) performs the following actions to generate the top j likely words for a given word by using a contextual language model;
(1) obtain the pretrained transfer learning based contextual language model;
(2) obtain all classes in imbalanced dataset 116 (see FIG. 1) and the text records in the classes;
(3) fine tune the contextual language model on the given classes as a classification task;
(4) define j, the number of probable words (i.e., likely words) for a given word;
(5) obtain the word priority list and the corresponding text record from suitable word generation module 112 (see FIG. 3);
(6) for each word in the word priority list, (i) send the remaining words of the text record in the same sequence to the contextual language model and (ii) receive in response a list of top j probable words and their probability scores; and
(7) return the word priority list and the corresponding top j probable words and their probability scores to suitable sord generation module 112 (see FIG. 3).

In step 816 and for each word in the word priority list received in step 810 (see FIG. 8A), suitable word generation module 112 (see FIG. 1) calculates suitable word score(s) in scale 5 using synonym based sub-module 302 (see FIG. 3) to perform the following actions:
(1) obtain the synonyms of the word from the language dictionary;
(2) using class word score module 114 (see FIG. 1), calculate the class word scores in scale 1 of the synonyms;
(3) convert the class word scores to scale 5; and
(4) for each of the synonyms, calculate a suitable word score as the converted class word score In step 818 and for each word in the word priority list received in step 810 (see FIG. 8A), suitable word generation module 112 (see FIG. 1) identifies word(s) obtained in steps 812, 814, and 816 whose suitable word score >T2.

In step 820 and for each word in the word priority list received in step 810 (see FIG. 8A), suitable word generation module 112 (see FIG. 1) adds the words identified in step 818 to a suitable word list, thereby generating a final suitable word list to be sent to text augmentation module 108 (see FIG. 1). Suitable word generation module 112 (see FIG. 1) arranges the words in the suitable word list in descending order according to the respective suitable word scores of the words.

In step 822, suitable word generation module 112 (see FIG. 1) sends the suitable word lists for the respective words in the word priority list to text augmentation module 108 (see FIG. 1).

Following step 822, the process of FIGS. 8A-8B ends at an end node 824.

In one embodiment, the process of FIGS. 8A-8B is performed between steps 508 and 510 in FIG. 5.

In one embodiment, the process of FIGS. 7A-7B is performed in the portions of steps 812, 814, and 816 that use class word score module 114 (see FIG. 1).

In one embodiment, the conversions of scores from one scale to another scale (i.e., from an old scale to a new scale), as described in step 616 (see FIG. 6A), and in the actions described above performed by synonym based sub-module 302, static embeddings similarity based sub-module 304, and contextual language based sub-module 306 use the following scale converter formula.

Scale Converter Formula:

$$\text{old range of old scale} = \text{old maximum} - \text{old minimum}$$

$$\text{new range of new scale} = \text{new maximum} - \text{new minimum}$$

$$\text{new value in new scale} = \left(\frac{(\text{old value} - \text{old minimum})}{\text{old range}} * \text{new range}\right) + \text{new minimum}$$

Examples

Figure 9:
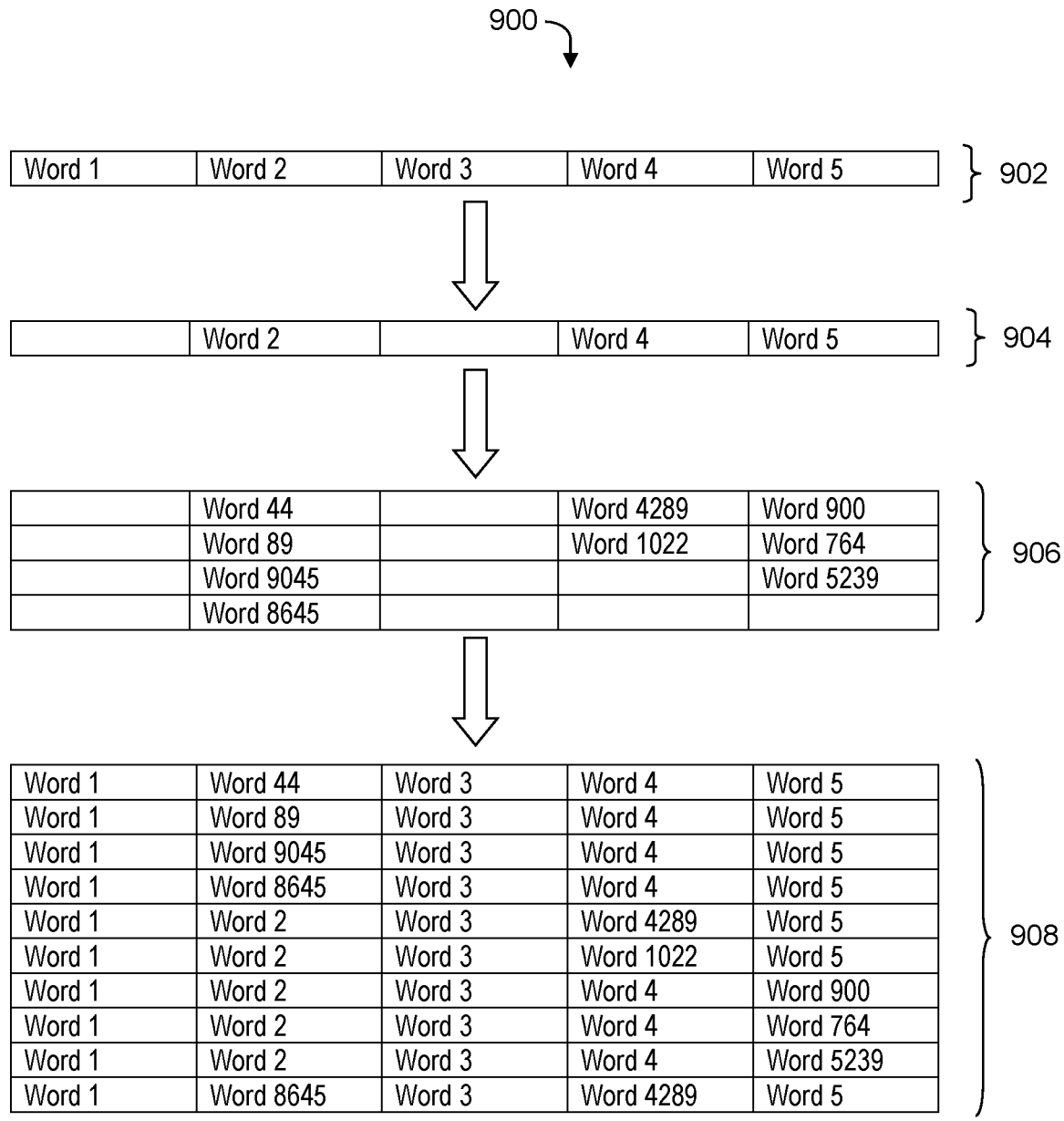
FIG. 9 is an example of augmenting text records of a small class in the process of FIG. 5, where the process is performed by a text augmentation module included in the system of FIG. 1, in accordance with embodiments of the present invention.

FIG. 9 is an example 900 of augmenting text records of a small class in the process of FIG. 5, where the process is performed by a text augmentation module included in the system of FIG. 1, in accordance with embodiments of the present invention. Text record 902 is an example of the initial text records received by text augmentation module 108 (see FIG. 1) in step 502 (see FIG. 5). Word priority list 904 includes the words (i.e., Word 2, Word 4, and Word 5) that word priority module 110 (see FIG. 1) identified as words in text record 902 that are to be replaced.

Text augmentation module 108 (see FIG. 1) receives a suitable word list 906, which is an example of step 510 (see FIG. 5). Suitable word lists 906 includes a first suitable word list consisting of Word 44, Word 89, Word 9045, and Word 8645, which are identified as suitable replacement words for Word 2. Suitable word list 906 also includes a second suitable word list consisting of Word 4289 and Word 1022, which are identified as suitable replacement words for Word 4. Suitable word list 906 also includes a third suitable word list consisting of Word 900, Word 764, and Word 5239, which are identified as suitable replacement words for Word 5.

Text augmentation module 108 (see FIG. 1) generates new augmented text records 908 of the small class, which is an example of step 514 (see FIG. 5). For example, text augmentation module 108 (see FIG. 1) generates the new text record that consists of Word 1, Word 44, Word 3, Word 4, and Word 5 (i.e., the first row in the new augmented text records 908) by replacing a word from word priority list 904 (i.e., Word 2) with a replacement word (i.e., Word 44) selected from the suitable word list that corresponds to Word 2, where the suitable word list is included in suitable word lists 906). As another example, text augmentation module 108 (see FIG. 1) generates the new text record that consists of Word 1, Word 2, Word 3, Word 4289, and Word 5 (i.e., the fifth row in the new augmented text records 908) by replacing Word 4 in word priority list 904 with a replacement word (i.e., Word 4289) selected from the corresponding suitable word list included in suitable word lists 906.

Figure 10:
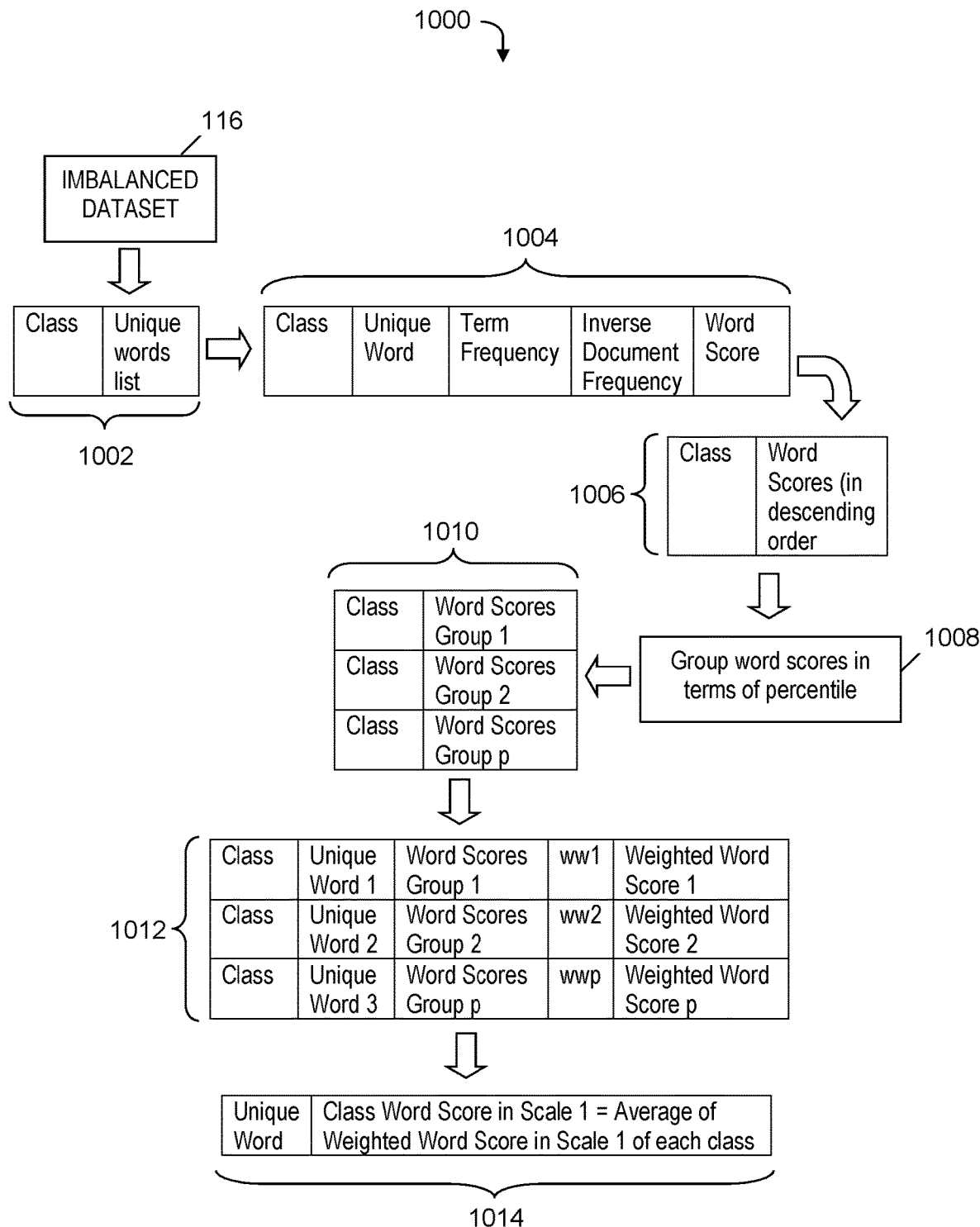
FIG. 10 is an example of determining class word scores in the process of FIGS. 7A-7B, where the process is performed by a class word score module in the system of FIG. 1, in accordance with embodiments of the present invention.

FIG. 10 is an example 1000 of determining class word scores in the process of FIGS. 7A-7B, where the process is performed by a class word score module in the system of FIG. 1, in accordance with embodiments of the present invention. Class word score module 114 (see FIG. 1) obtains text records and all classes 1002 from imbalanced dataset 116, which is an example of step 702 (see FIG. 7A). In step 710 (see FIG. 7A), class word score module 114 (see FIG. 1) makes calculations 1004, which include term frequency, inverse document frequency and word scores for each unique word in each class. In step 712 (see FIG. 7A), class word score module 114 (see FIG. 1) makes an arrangement of word scores 1006 in descending order for each class.

In step 1008, class word score module 114 (see FIG. 1) groups the word scores in terms of percentile to generate grouped word scores 1010, which is an example of a portion of step 712 (see FIG. 7A). Another portion of step 712 (see FIG. 7A) includes class word score module 114 (see FIG. 1) calculating weighted word scores 1012 for each word in a class. In step 716 (see FIG. 7B), class word score module 114 (see FIG. 1) calculates a class word score 1014 for each unique word across all the classes by calculating an average of the weighted word scores of each class.

Figure 11:
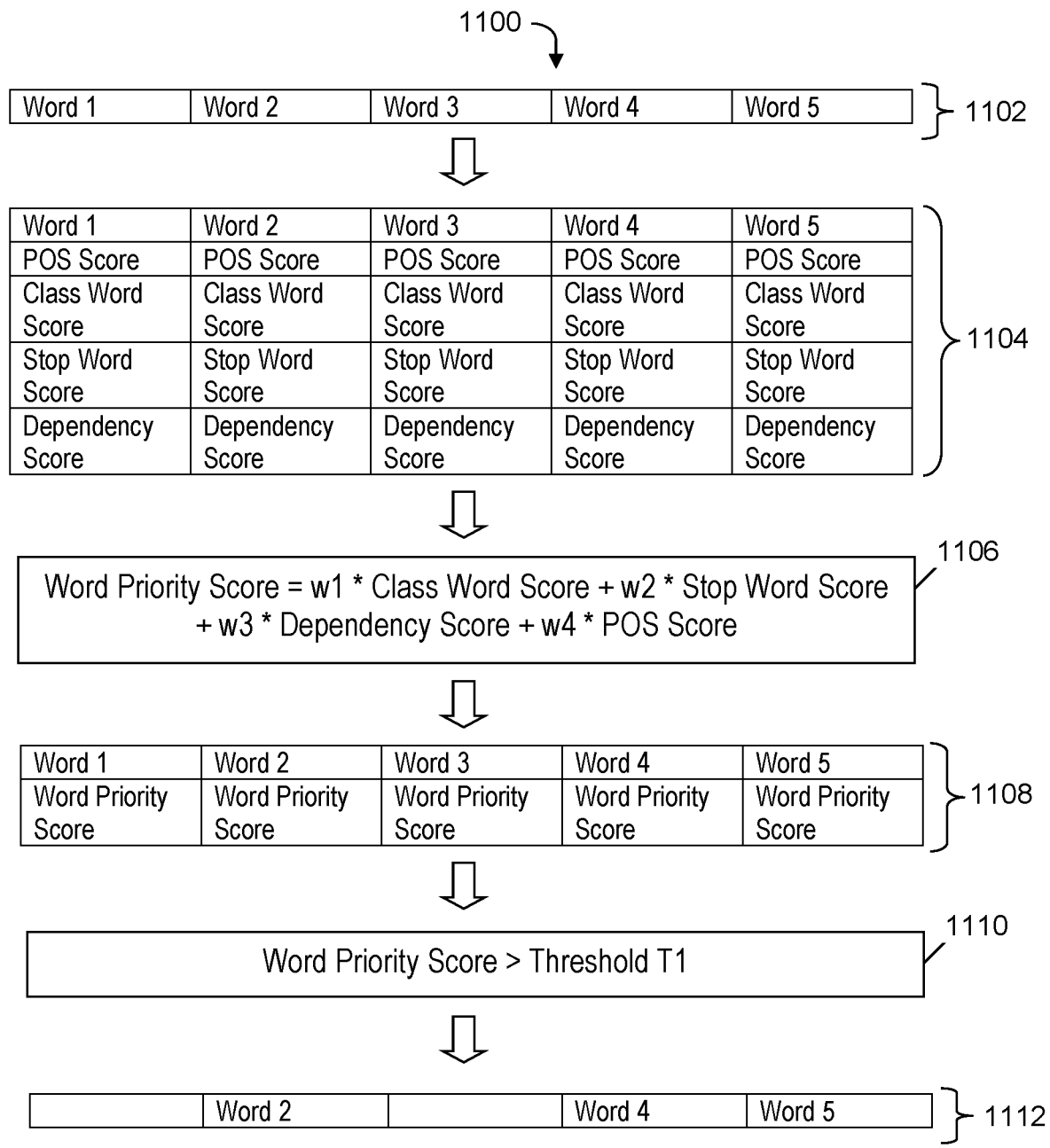
FIG. 11 is an example of generating a word priority list in the process of FIGS. 6A-6B, where the process is performed by a word priority module in the system of FIG. 1, in accordance with embodiments of the present invention.

FIG. 11 is an example 1100 of generating a word priority list in the process of FIGS. 6A-6B, where the process is performed by a word priority module in the system of FIG. 1, in accordance with embodiments of the present invention. In step 608 (see FIG. 6A), word priority module 110 (see FIG. 1) receives a text record 1102 from text augmentation module 108 (see FIG. 1). Text record 1102 consists of Word 1, Word, 2, Word 3, Word 4, and Word 5. In step 612, word priority module 110 (see FIG. 1) receives scores 1104, which include a POS score, a class word score, a stop word score, and a dependency score for each word in text record 1102.

In step 618 (see FIG. 6B), word priority module 110 (see FIG. 1) makes a word priority score calculation 1106 for each word in text record 1102, which results in word priority scores 1108 for respective words in text record 1102. The word priority score is based on the corresponding POS score, class word score, stop word score, and dependency score included in scores 1104.

In step 620 (see FIG. 6B), word priority module 110 (see FIG. 1) makes a determination 1110 that word priority scores corresponding to Word 2, Word 4, and Word 5 are greater than a threshold score T1. In step 622 (see FIG. 6B) and based on the aforementioned word priority scores being greater than the threshold score T1, word priority module 110 (see FIG. 1) generates word priority list 1112 that consists of Word 2, Word, 4, and Word 5. Word priority list 1112 indicates that Word 2, Word 4, and Word 5 are the words in text record 1102 that are to be replaced by suitable word replacements to generate new augmented text records.

Figure 12:
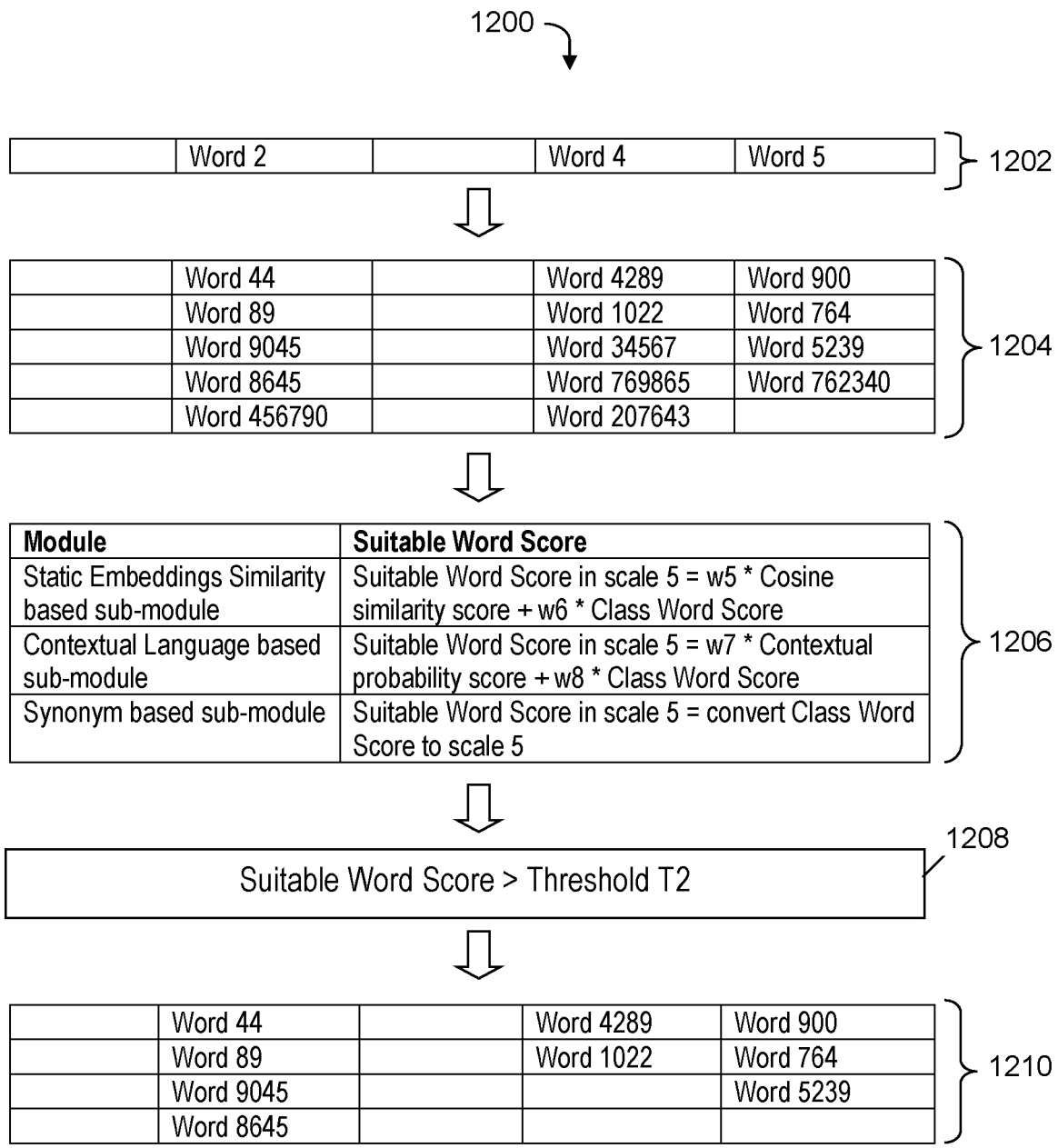
FIG. 12 is an example of generating a suitable word list in the process of FIGS. 8A-8B, where the process is performed by a suitable word generation module in the system of FIG. 1, in accordance with embodiments of the present invention.

FIG. 12 is an example 1200 of generating a suitable word list in the process of FIGS. 8A-8B, where the process is performed by a suitable word generation module in the system of FIG. 1, in accordance with embodiments of the present invention. In step 810 (see FIG. 8A), suitable word generation module 112 (see FIG. 1) receives word priority list 1202, which is the same word priority list generated by the example 1100 (see FIG. 11).

In step 812 (see FIG. 8A) and steps 814 and 816 (see FIG. 8B), suitable word generation module 112 (see FIG. 1) generates initial (i.e., possible or tentative) suitable words 1204 for each word in word priority list 1202. The initial suitable words 1204 are determined by synonym based sub-module 302 (see FIG. 3), static embeddings similarity based sub-module 304 (see FIG. 3), and contextual language based sub-module 306 (see FIG. 3).

In step 812 (see FIG. 8A) and steps 814 and 816 (see FIG. 8B), suitable word generation module 112 (see FIG. 1) calculates respective suitable word scores 1206 for the initial suitable words 1204 by using synonym based sub-module 302 (see FIG. 3), static embeddings similarity based sub-module 304 (see FIG. 3), and contextual language based sub-module 306 (see FIG. 3).

In step 1208, suitable word generation module 112 (see FIG. 1) determines which of the suitable word scores 1206 is greater than a threshold score T2. If a suitable word score for a given word is greater than the threshold score T2, suitable word generation module 112 (see FIG. 1) designates the given word as a final suitable replacement word for the corresponding word in word priority list 1202 and adds the given word to suitable word lists 1210. For example, suitable word generation module 112 (see FIG. 1) determines that the suitable word score for Word 44 is greater than the threshold score T2 and in response, adds Word 44 to suitable word lists 1210.

Computer System

Figure 13:
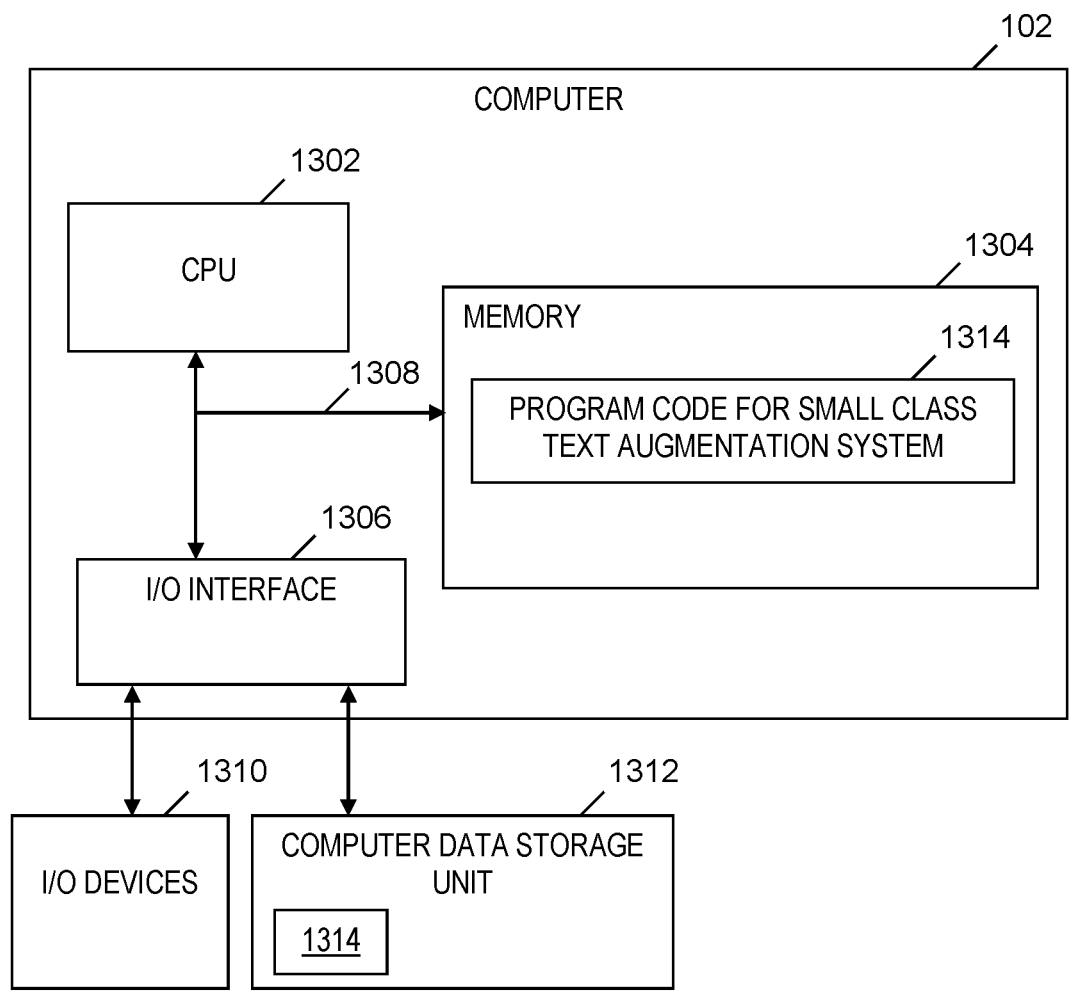
FIG. 13 is a block diagram of a computer that is included in the system of FIG. 1 and that implements the processes of FIG. 4, FIG. 5, FIGS. 6A-6B, FIGS. 7A-7B, and FIGS. 8A-8B, in accordance with embodiments of the present invention.

FIG. 13 is a block diagram of a computer that is included in the system of FIG. 1 and that implements the processes of FIG. 4, FIG. 5, FIGS. 6A-6B, FIGS. 7A-7B, and FIGS. 8A-8B, in accordance with embodiments of the present invention. Computer 102 is a computer system that generally includes a central processing unit (CPU) 1302, a memory 1304, an input/output (I/O) interface 1306, and a bus 1308. Further, computer 102 is coupled to I/O devices 1310 and a computer data storage unit 1312. CPU 1302 performs computation and control functions of computer 102, including executing instructions included in program code 1314 for small class text augmentation system 104 (see FIG. 1) to perform a method of augmenting text of a small class, where the instructions are executed by CPU 1302 via memory 1304. CPU 1302 may include a single processing unit or processor or be distributed across one or more processing units or one or more processors in one or more locations (e.g., on a client and server).

Memory 1304 includes a known computer readable storage medium, which is described below. In one embodiment, cache memory elements of memory 1304 provide temporary storage of at least some program code (e.g., program code 1314) in order to reduce the number of times code must be retrieved from bulk storage while instructions of the program code are executed. Moreover, similar to CPU 1302, memory 1304 may reside at a single physical location, including one or more types of data storage, or be distributed across a plurality of physical systems or a plurality of computer readable storage media in various forms. Further, memory 1304 can include data distributed across, for example, a local area network (LAN) or a wide area network (WAN).

I/O interface 1306 includes any system for exchanging information to or from an external source. I/O devices 1310 include any known type of external device, including a display, keyboard, etc. Bus 1308 provides a communication link between each of the components in computer 102, and may include any type of transmission link, including electrical, optical, wireless, etc.

I/O interface 1306 also allows computer 102 to store information (e.g., data or program instructions such as program code 1314) on and retrieve the information from computer data storage unit 1312 or another computer data storage unit (not shown). Computer data storage unit 1312 includes one or more known computer readable storage media, where a computer readable storage medium is described below. In one embodiment, computer data storage unit 1312 is a non-volatile data storage device, such as, for example, a solid-state drive (SSD), a network-attached storage (NAS) array, a storage area network (SAN) array, a magnetic disk drive (i.e., hard disk drive), or an optical disc drive (e.g., a CD-ROM drive which receives a CD-ROM disk or a DVD drive which receives a DVD disc).

Memory 1304 and/or storage unit 1312 may store computer program code 1314 that includes instructions that are executed by CPU 1302 via memory 1304 to augment text of a small class. Although FIG. 13 depicts memory 1304 as including program code, the present invention contemplates embodiments in which memory 1304 does not include all of code 1314 simultaneously, but instead at one time includes only a portion of code 1314.

Further, memory 1304 may include an operating system (not shown) and may include other systems not shown in FIG. 13.

As will be appreciated by one skilled in the art, in a first embodiment, the present invention may be a method; in a second embodiment, the present invention may be a system; and in a third embodiment, the present invention may be a computer program product.

Any of the components of an embodiment of the present invention can be deployed, managed, serviced, etc. by a service provider that offers to deploy or integrate computing infrastructure with respect to augmenting text of a small class. Thus, an embodiment of the present invention discloses a process for supporting computer infrastructure, where the process includes providing at least one support service for at least one of integrating, hosting, maintaining and deploying computer-readable code (e.g., program code 1314) in a computer system (e.g., computer 102) including one or more processors (e.g., CPU 1302), wherein the processor(s) carry out instructions contained in the code causing the computer system to augment text of a small class. Another embodiment discloses a process for supporting computer infrastructure, where the process includes integrating computer-readable program code into a computer system including a processor. The step of integrating includes storing the program code in a computer-readable storage device of the computer system through use of the processor. The program code, upon being executed by the processor, implements a method of augmenting text of a small class.

While it is understood that program code 1314 for augmenting text of a small class may be deployed by manually loading directly in client, server and proxy computers (not shown) via loading a computer-readable storage medium (e.g., computer data storage unit 1312), program code 1314 may also be automatically or semi-automatically deployed into computer 102 by sending program code 1314 to a central server or a group of central servers. Program code 1314 is then downloaded into client computers (e.g., computer 102) that will execute program code 1314. Alternatively, program code 1314 is sent directly to the client computer via e-mail. Program code 1314 is then either detached to a directory on the client computer or loaded into a directory on the client computer by a button on the e-mail that executes a program that detaches program code 1314 into a directory. Another alternative is to send program code 1314 directly to a directory on the client computer hard drive. In a case in which there are proxy servers, the process selects the proxy server code, determines on which computers to place the proxy servers' code, transmits the proxy server code, and then installs the proxy server code on the proxy computer. Program code 1314 is transmitted to the proxy server and then it is stored on the proxy server.

Another embodiment of the invention provides a method that performs the process steps on a subscription, advertising and/or fee basis. That is, a service provider can offer to create, maintain, support, etc. a process of augmenting text of a small class. In this case, the service provider can create, maintain, support, etc. a computer infrastructure that performs the process steps for one or more customers. In return, the service provider can receive payment from the customer(s) under a subscription and/or fee agreement, and/or the service provider can receive payment from the sale of advertising content to one or more third parties.

The present invention may be a system, a method, and/or a computer program product at any possible technical detail level of integration. The computer program product may include a computer readable storage medium (or media) (i.e., memory 1304 and computer data storage unit 1312) having computer readable program instructions 1314 thereon for causing a processor (e.g., CPU 1302) to carry out aspects of the present invention.

The computer readable storage medium can be a tangible device that can retain and store instructions (e.g., program code 1314) for use by an instruction execution device (e.g., computer 102). The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions (e.g., program code 1314) described herein can be downloaded to respective computing/processing devices (e.g., computer 102) from a computer readable storage medium or to an external computer or external storage device (e.g., computer data storage unit 1312) via a network (not shown), for example, the Internet, a local area network, a wide area network and/or a wireless network. The network may comprise copper transmission cables, optical transmission fibers, wireless transmission, routers, firewalls, switches, gateway computers and/or edge servers. A network adapter card (not shown) or network interface (not shown) in each computing/processing device receives computer readable program instructions from the network and forwards the computer readable program instructions for storage in a computer readable storage medium within the respective computing/processing device.

Computer readable program instructions (e.g., program code 1314) for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations (e.g., FIG. 4, FIG. 5, FIGS. 6A-6B, FIGS. 7A-7B, and FIGS. 8A-8B) and/or block diagrams (e.g., FIG. 1, FIG. 2, FIG. 3, and FIG. 13) of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions (e.g., program code 1314).

These computer readable program instructions may be provided to a processor (e.g., CPU 1302) of a general purpose computer, special purpose computer, or other programmable data processing apparatus (e.g., computer 102) to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium (e.g., computer data storage unit 1312) that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions (e.g., program code 1314) may also be loaded onto a computer (e.g. computer 102), other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A computer-implemented method comprising:
receiving, by one or more processors, an imbalanced dataset;
identifying, by the one or more processors, a small class that includes initial text records included in the imbalanced dataset;
generating, by the one or more processors, a balanced dataset from the imbalanced dataset by augmenting the initial text records by using weighted word scores indicating respective measures of importance of words in classes in the imbalanced dataset;
sending, by the one or more processors, the balanced dataset to a supervised machine learning model;
training, by the one or more processors, the supervised machine learning model on the balanced dataset; and
using the supervised machine learning model employing the augmented initial text records, performing, by the one or more processors, a text classification of a new dataset whose domain matches a domain of the imbalanced dataset,
wherein the augmenting the initial text records includes:
receiving an initial text record included in the initial text records;
for a given word in the initial text record, determining a stop word score indicating whether the given word is present or not present in a list of stop words;
for the given word in the initial text record, determining a dependency score indicating a syntactic dependency relationship between the given word and other words in the initial text record;
for the given word in the initial text record, determining a part of speech (POS) score indicating a lexical category of the given word;
for the given word in the initial text record, determining a word priority score as w1*a class word score+w2*the stop word score+w3*the dependency score+w4*the POS score, wherein w1, w2, w3, and w4 are weights;
determining the word priority score for the given word in the initial text record is greater than a threshold word priority score; and
based on the word priority score for the given word being greater than the threshold word priority score, selecting the given word as a word in the initial text record that needs to be replaced.

2. The method of claim 1, wherein the generating the balanced dataset from the imbalanced dataset includes:
for each unique word in each class in the imbalanced dataset, determining a word score of a given unique word by multiplying a frequency of the given unique word in a given class by an inverse document frequency value of the given unique word;
for each class, arranging word scores of words in a given class in descending order, dividing the word scores of the words in the given class into p number of groups in terms of percentile in descending order, and determining the weighted word scores by multiplying a word score of a given group included in the p number of groups by word weights assigned for the given group;
determining a list of unique words across the classes; and
for each unique word across the classes, determining the class word score as an average of the weighted word scores across the classes.

3. The method of claim 2, wherein the augmenting the initial text records includes:
receiving a word priority list of words that need to be replaced in the initial text record, the word priority list including the selected given word and other words selected using respective word priority scores that exceed the threshold word priority score and that are based on respective class word scores, stop word scores, dependency scores, and POS scores;
for given word(s) in the word priority list, determining suitable word scores based on similar words using a cosine similarity score, contextual words using a contextual probability score, synonyms from a language dictionary, and respective class word scores;
determining that one or more of the suitable word scores are greater than a threshold suitable word score;
based on the one or more of the suitable word scores being greater than the threshold suitable word score, generating corresponding list(s) of suitable words to replace the given word(s) in the word priority list;
generating new text record(s) by replacing the given word(s) in the initial text record with word(s) included in the corresponding list(s) of suitable words; and
generating the augmented initial text records as including the new text record(s) and the initial text records, wherein the training the supervised machine learning model on the balanced dataset includes training the supervised machine learning model on the new text record(s) and the initial text records.

4. The method of claim 3, further comprising:
for each of the given word(s) in the word priority list, determining, by the one or more processors, top k number of similar words and a cosine similarity score of the top k number of similar words from a static embeddings similarity module;
determining, by the one or more processors, a class word score of the top k number of similar words; and
determining, by the one or more processors, a suitable word score as w5*the cosine similarity score of the top k number of similar words+w6*the class word score of the top k number of similar words, wherein w5 and w6 are weights and wherein the suitable word score is included in the suitable word scores.

5. The method of claim 3, further comprising:
for each of the given word(s) in the word priority list, determining, by the one or more processors, top j number of likely words and contextual probability scores of the top j number of likely words from a contextual language module;
determining, by the one or more processors, a class word score of the top j number of likely words; and
determining, by the one or more processors, a suitable word score as w7*the contextual probability score of the top j number of likely words+w8*the class word score of the top j number of likely words, wherein w7 and w8 are weights and wherein the suitable word score is included in the suitable word scores.

6. The method of claim 3, further comprising:
for each of the given word(s) in the word priority list, obtaining, by the one or more processors, a complete set of synonyms included in the language dictionary;
determining, by the one or more processors, a class word score of the synonyms in the complete set of synonyms; and
determining, by the one or more processors, a suitable word score as the class word score, wherein the suitable word score is included in the suitable word scores.

7. The method of claim 1, further comprising:
providing at least one support service for at least one of creating, integrating, hosting, maintaining, and deploying computer readable program code in the computer, the program code being executed by a processor of the computer to implement the receiving the imbalanced dataset, the identifying the small class, the generating the balanced dataset, the sending the balanced dataset to the supervised machine learning model, the training the supervised machine learning model, and the performing the text classification of the new dataset whose domain matches the domain of the imbalanced dataset.

8. A computer program product for augmenting text, the computer program product comprising:
one or more computer readable storage media having computer readable program code collectively stored on the one or more computer readable storage media, the computer readable program code being executed by a central processing unit (CPU) of a computer system to cause the computer system to perform a method comprising:
the computer system receiving an imbalanced dataset;
the computer system identifying a small class that includes initial text records included in the imbalanced dataset;
the computer system generating a balanced dataset from the imbalanced dataset by augmenting the initial text records by using weighted word scores indicating respective measures of importance of words in classes in the imbalanced dataset;
the computer system sending the balanced dataset to a supervised machine learning model;
the computer system training the supervised machine learning model on the balanced dataset; and
using the supervised machine learning model employing the augmented initial text records, the computer system performing a text classification of a new dataset whose domain matches a domain of the imbalanced dataset,
wherein the augmenting the initial text records includes:
receiving an initial text record included in the initial text records;
for a given word in the initial text record, determining a stop word score indicating whether the given word is present or not present in a list of stop words;
for the given word in the initial text record, determining a dependency score indicating a syntactic dependency relationship between the given word and other words in the initial text record;
for the given word in the initial text record, determining a part of speech (POS) score indicating a lexical category of the given word;
for the given word in the initial text record, determining a word priority score as w1*a class word score+ w2*the stop word score+w3*the dependency score+ w4*the POS score, wherein w1, w2, w3, and w4 are weights;
determining the word priority score for the given word in the initial text record is greater than a threshold word priority score; and
based on the word priority score for the given word being greater than the threshold word priority score, selecting the given word as a word in the initial text record that needs to be replaced.

9. The computer program product of claim 8, wherein the generating the balanced dataset from the imbalanced dataset includes:

for each unique word in each class in the imbalanced dataset, determining a word score of a given unique word by multiplying a frequency of the given unique word in a given class by an inverse document frequency value of the given unique word;
for each class, arranging word scores of words in a given class in descending order, dividing the word scores of the words in the given class into p number of groups in terms of percentile in descending order, and determining the weighted word scores by multiplying a word score of a given group included in the p number of groups by word weights assigned for the given group;
determining a list of unique words across the classes; and
for each unique word across the classes, determining a class word score as an average of the weighted word scores across the classes.

10. The computer program product of claim 9, wherein the augmenting the initial text records includes:
receiving a word priority list of words that need to be replaced in the initial text record, the word priority list including the selected given word and other words selected using respective word priority scores that exceed the threshold word priority score and that are based on respective class word scores, stop word scores, dependency scores, and POS scores;
for given word(s) in the word priority list, determining suitable word scores based on similar words using a cosine similarity score, contextual words using a contextual probability score, synonyms from a language dictionary, and respective class word scores;
determining that one or more of the suitable word scores are greater than a threshold suitable word score;
based on the one or more of the suitable word scores being greater than the threshold suitable word score, generating corresponding list(s) of suitable words to replace the given word(s) in the word priority list;
generating new text record(s) by replacing the given word(s) in the initial text record with word(s) included in the corresponding list(s) of suitable words; and
generating the augmented initial text records as including the new text record(s) and the initial text records, wherein the training the supervised machine learning model on the balanced dataset includes training the supervised machine learning model on the new text record(s) and the initial text records.

11. The computer program product of claim 10, wherein the method further comprises:
for each of the given word(s) in the word priority list, the computer system determining top k number of similar words and a cosine similarity score of the top k number of similar words from a static embeddings similarity module;
the computer system determining a class word score of the top k number of similar words; and
the computer system determining a suitable word score as w5*the cosine similarity score of the top k number of similar words+w6*the class word score of the top k number of similar words, wherein w5 and w6 are weights and wherein the suitable word score is included in the suitable word scores.

12. The computer program product of claim 10, wherein the method further comprises:
for each of the given word(s) in the word priority list, the computer system determining top j number of likely words and contextual probability scores of the top j number of likely words from a contextual language module;

the computer system determining a class word score of the top j number of likely words; and the computer system determining a suitable word score as w7*the contextual probability score of the top j number of likely words+w8*the class word score of the top j number of likely words, wherein w7 and w8 are weights and wherein the suitable word score is included in the suitable word scores.

13. A computer system comprising:
a central processing unit (CPU);
a memory coupled to the CPU; and
one or more computer readable storage media coupled to the CPU, the one or more computer readable storage media collectively containing instructions that are executed by the CPU via the memory to implement a method of augmenting text, the method comprising:
the computer system receiving an imbalanced dataset;
the computer system identifying a small class that includes initial text records included in the imbalanced dataset;
the computer system generating a balanced dataset from the imbalanced dataset by augmenting the initial text records by using weighted word scores indicating respective measures of importance of words in classes in the imbalanced dataset;
the computer system sending the balanced dataset to a supervised machine learning model;
the computer system training the supervised machine learning model on the balanced dataset; and
using the supervised machine learning model employing the augmented initial text records, the computer system performing a text classification of a new dataset whose domain matches a domain of the imbalanced dataset,
wherein the augmenting the initial text records includes:
receiving an initial text record included in the initial text records;
for a given word in the initial text record, determining a stop word score indicating whether the given word is present or not present in a list of stop words;
for the given word in the initial text record, determining a dependency score indicating a syntactic dependency relationship between the given word and other words in the initial text record;
for the given word in the initial text record, determining a part of speech (POS) score indicating a lexical category of the given word;
for the given word in the initial text record, determining a word priority score as w1*a class word score+ w2*the stop word score+w3*the dependency score+ w4*the POS score, wherein w1, w2, w3, and w4 are weights;
determining the word priority score for the given word in the initial text record is greater than a threshold word priority score; and
based on the word priority score for the given word being greater than the threshold word priority score, selecting the given word as a word in the initial text record that needs to be replaced.

14. The computer system of claim 13, wherein the generating the balanced dataset from the imbalanced dataset includes:
for each unique word in each class in the imbalanced dataset, determining a word score of a given unique word by multiplying a frequency of the given unique word in a given class by an inverse document frequency value of the given unique word;

for each class, arranging word scores of words in a given class in descending order, dividing the word scores of the words in the given class into p number of groups in terms of percentile in descending order, and determining the weighted word scores by multiplying a word score of a given group included in the p number of groups by word weights assigned for the given group;
determining a list of unique words across the classes; and
for each unique word across the classes, determining a class word score as an average of the weighted word scores across the classes.

15. The computer system of claim 14, wherein the augmenting the initial text records includes:
receiving a word priority list of words that need to be replaced in the initial text record, the word priority list including the selected given word and other words selected using respective word priority scores that exceed the threshold word priority score and that are based on respective class word scores, stop word scores, dependency scores, and POS scores;
for given word(s) in the word priority list, determining suitable word scores based on similar words using a cosine similarity score, contextual words using a contextual probability score, synonyms from a language dictionary, and respective class word scores;
determining that one or more of the suitable word scores are greater than a threshold suitable word score;
based on the one or more of the suitable word scores being greater than the threshold suitable word score, generating corresponding list(s) of suitable words to replace the given word(s) in the word priority list;
generating new text record(s) by replacing the given word(s) in the initial text record with word(s) included in the corresponding list(s) of suitable words; and
generating the augmented initial text records as including the new text record(s) and the initial text records, wherein the training the supervised machine learning model on the balanced dataset includes training the supervised machine learning model on the new text record(s) and the initial text records.

16. The computer system of claim 15, wherein the method further comprises:
for each of the given word(s) in the word priority list, the computer system determining top k number of similar words and a cosine similarity score of the top k number of similar words from a static embeddings similarity module;
the computer system determining a class word score of the top k number of similar words; and
the computer system determining a suitable word score as w5*the cosine similarity score of the top k number of similar words+w6*the class word score of the top k number of similar words, wherein w5 and w6 are weights and wherein the suitable word score is included in the suitable word scores.

17. The computer system of claim 15, wherein the method further comprises:
for each of the given word(s) in the word priority list, the computer system determining top j number of likely words and contextual probability scores of the top j number of likely words from a contextual language module;
the computer system determining a class word score of the top j number of likely words; and
the computer system determining a suitable word score as w7*the contextual probability score of the top j number of likely words+w8*the class word score of the top j number of likely words, wherein w7 and w8 are weights and wherein the suitable word score is included in the suitable word scores.

* * * * *